(12) United States Patent
Shah et al.

(10) Patent No.: US 12,096,521 B2
(45) Date of Patent: Sep. 17, 2024

(54) REMOTE SIM PROVISIONING

(71) Applicant: QUALCOMM Incorporated, San Diego, CA (US)

(72) Inventors: Abhi Umeshkumar Shah, San Diego, CA (US); Rajashekar Chilla, San Diego, CA (US); Lakshmi Bhavani Garimella Srivenkata, San Diego, CA (US); Mrudula Sekar, San Diego, CA (US); Alan Soloway, Erie, CO (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/188,503

(22) Filed: Mar. 23, 2023

(65) Prior Publication Data

US 2023/0224699 A1  Jul. 13, 2023

Related U.S. Application Data

(60) Division of application No. 17/216,429, filed on Mar. 29, 2021, now Pat. No. 11,653,197, which is a
(Continued)

(51) Int. Cl.
*H04W 8/26* (2009.01)
*H04W 4/70* (2018.01)
(Continued)

(52) U.S. Cl.
CPC ............ *H04W 8/265* (2013.01); *H04W 4/70* (2018.02); *H04W 8/183* (2013.01); *H04W 8/20* (2013.01)

(58) Field of Classification Search
CPC ....... H04W 8/265; H04W 4/70; H04W 8/183; H04W 8/20
(Continued)

(56) References Cited

U.S. PATENT DOCUMENTS 9,831,903 B1   11/2017  Narasimhan et al.
11,533,605 B2  12/2022  Shah et al.
(Continued)

FOREIGN PATENT DOCUMENTS

| EP | 3337204 A1 | 6/2018 |
| WO | 2019042541 A1 | 3/2019 |
| WO | 2019137630 A1 | 7/2019 |

OTHER PUBLICATIONS

BT Group: "Addition of Use Case on to TR-0048 Use Case 5: IoT Application Certificate—Trusted Root", SEC-2017-0174-TR-0048_ USE_CASE_5_IOT_Application_Certificate_-_Trusted_Root. Doc,oneM2M, vol. WG4—Security, SEC Nov. 13, 2017 (Nov. 13, 2017), XP084025169, pp. 1-16, Retrieved from the Internet: URL: URL=http://member.onem2m.org/Application/documentapp/ downloadimmediate/default.aspx?docID=24590 [retrieved on Nov. 13, 2017] Sections 4.3 and 7.
(Continued)

*Primary Examiner* — Mark G. Pannell
(74) *Attorney, Agent, or Firm* — The Marbury Law Group, PLLC

(57) ABSTRACT

Various aspects include methods for supporting remote Subscriber Identity Module (SIM) profile provisioning that may be performed by a Lightweight Machine-to-Machine (LwM2M) server and LwM2M client computing devices, such as Internet of Things (IoT) devices. A LwM2M server may generate a remote SIM provisioning object for the LwM2M client computing device indicating that the SIM profile update for the LwM2M client computing device is available, and send the remote SIM provisioning object to the LwM2M client computing device. A LwM2M client
(Continued)

computing device may receive a remote Subscriber Identity Module (SIM) provisioning object from a LwM2M server indicating that a SIM profile update for the LwM2M client computing device is available, and download the SIM profile update in response to receiving the remote SIM provisioning object.

12 Claims, 22 Drawing Sheets

Related U.S. Application Data continuation-in-part of application No. 17/090,477, filed on Nov. 5, 2020, now Pat. No. 11,533,605.

(51) Int. Cl.
    *H04W 8/18* (2009.01)
    *H04W 8/20* (2009.01)
(58) Field of Classification Search
    USPC .......................................................... 370/329
    See application file for complete search history.

(56) References Cited

U.S. PATENT DOCUMENTS

| | | |
|---|---|---|
| 2005/0153741 A1 | 7/2005 | Chen et al. |
| 2008/0305815 A1 | 12/2008 | McDonough |
| 2010/0311404 A1 | 12/2010 | Shi et al. |
| 2011/0306318 A1 | 12/2011 | Rodgers et al. |
| 2014/0198702 A1 | 7/2014 | Lin et al. |
| 2016/0142906 A1 | 5/2016 | Park et al. |
| 2016/0301529 A1 | 10/2016 | Park et al. |
| 2017/0077975 A1 | 3/2017 | Wang et al. |
| 2017/0180349 A1 | 6/2017 | Park |
| 2018/0041601 A1 | 2/2018 | Park et al. |
| 2018/0069581 A1 | 3/2018 | Narasimhan et al. |
| 2018/0070224 A1 | 3/2018 | Park et al. |
| 2018/0084426 A1 | 3/2018 | Yang |
| 2018/0150289 A1 | 5/2018 | Adrangi et al. |
| 2018/0294949 A1 | 10/2018 | Yang |
| 2018/0308087 A1 | 10/2018 | Maimon |
| 2018/0352422 A1 | 12/2018 | Shah et al. |
| 2019/0065749 A1 | 2/2019 | Yang |
| 2019/0075453 A1 | 3/2019 | Yoon et al. |
| 2019/0166488 A1 | 5/2019 | Park et al. |
| 2019/0174299 A1 | 6/2019 | Ullah et al. |
| 2019/0181901 A1 | 6/2019 | Namiranian |
| 2019/0191298 A1 | 6/2019 | Kim et al. |
| 2019/0208405 A1 | 7/2019 | Park et al. |
| 2019/0268765 A1 | 8/2019 | Park et al. |
| 2019/0281442 A1 | 9/2019 | Kim et al. |
| 2019/0373471 A1 | 12/2019 | Li et al. |
| 2019/0380026 A1 | 12/2019 | Lee et al. |
| 2019/0394053 A1 | 12/2019 | Yu et al. |
| 2020/0015069 A1 | 1/2020 | Anslot et al. |
| 2020/0236546 A1 | 7/2020 | Yu et al. |
| 2020/0252788 A1 | 8/2020 | Lou et al. |
| 2020/0351656 A1 | 11/2020 | Johansson et al. |
| 2020/0404501 A1 | 12/2020 | Kang et al. |
| 2022/0141644 A1 | 5/2022 | Shah et al. |
| 2022/0141652 A1 | 5/2022 | Shah et al. |
| 2022/0295288 A1 | 9/2022 | Ståhl et al. |
| 2023/0093167 A1 | 3/2023 | Shah et al. |
| 2023/0362621 A1 | 11/2023 | Shah et al. |

OTHER PUBLICATIONS

International Search Report and Written Opinion—PCT/US2021/053325—ISA/EPO—Feb. 4, 2022 17 pages.

International Search Report and Written Opinion—PCT/US2021/054854—ISA/EPO—Feb. 7, 2022 20 pages.

Kovacs, B., et al., "UICC Modules and the IoT", Ericsson Technology Review, Charting the Future of Innovation, Apr. 14, 2020 (Apr. 14, 2020), XP055807925, pp. 1-12, Retrieved from the Internet: URL: https://www.ericsson.com/497445/assets/local/reports-papers/ericsson-technologyreview/docs/2020/uicc-modules-and-the-iot.pdf [retrieved on May 26, 2021] p. 2, line 1-p. 5, Paragraph Usage of 3GPP Standardized Certificate-Based Authe, Figure 1.

OMA: "Lightweight Machine to Machine Technical Specification", OMA-TS-LightweightM2M-V1_0_2-20180131-D, Open Mobile Alliance (OMA), 4330 LA Jolla Village DR., Suite 110 San Diego, CA 92122, USA No. 1.0.2 Jan. 31, 2018 (Jan. 31, 2018), XP064192364, pp. 1-141, Retrieved from the Internet: URL: ftp/Public_documents/DM/LightweightM2M/Permanent_documents/ [retrieved on Jan. 31, 2018] Sections 5.2.3.4, 8.2.4.

OMA Specworks: "Lightweight Machine to Machine Technical Specification: Transport Bindings", OMA-TS-LightweightM2M_Transport-V1_1-20180710-A, Open Mobile Alliance (OMA), 4330 LA Jolla Village DR., Suite 110 San Diego, CA 92122, USA, Aug. 6, 2018 (Aug. 6, 2018), XP064192961, pp. 1-67, Retrieved from the Internet: URL: ftp/Public_documents/DM/LightweightM2M/Permanent_documents/ [retrieved on Aug. 7, 2018] Sections 5.2.8. 6. Point 3 and 6.4.2.

Smeets B., et al., "IoT SIM Cards for Seamless Global Connectivity—Ericsson," Evolving SIM Solutions for IOT, May 27, 2019, 6 pages.

| Remote SIM Provisioning Object | 351 | |
|---|---|---|
| Object URN | 352 | |
| ID | Name | Type |
| 0 | Current SIM Type | Integer |
| 1 | Supported SIM Type | Integer |
| 2 | Service Provider Name | String |
| 3 | Profile Package | Data |
| 4 | Profile URI | String |
| 5 | Profile Update | None |
| 6 | State | Integer |
| 7 | Update Result | Integer |
| 8 | Profile Name | String |
| 9 | Profile Package Version | String |
| 10 | Profile Update Protocol Support | Integer |
| 11 | Profile Update Delivery Method | Integer |
| 12 | Free Memory On SIM | Integer |
| 13 | Total Memory On SIM | Integer |
| 14 | Supported LTE Band Information | Integer |
| 15 | Supported EGPRS Band Information | Integer |
| 16 | Supported TD-SCDMA Band Information | Integer |
| 17 | Supported WCDMA Band Information | Integer |
| 18 | Supported CDMA-2000 Band Information | Integer |
| 19 | Supported WiMAX Band Information | Integer |
| 20 | Supported NB-IoT Band Information | Integer |
| 21 | Supported 5G Band Information | Integer |
| 22 | Integrated Circuit Card Identifier (ICCID) | Integer |
| 23 | eUICC ID | Integer |
| 24 | Profile Type | Integer |

FIG. 3B

REMOTE SIM PROVISIONING

RELATED APPLICATIONS

This application is a division of U.S. Non-Provisional application Ser. No. 17/216,429 filed Mar. 29, 2021, entitled "Remote SIM Provisioning," which is a continuation-in-part of U.S. Non-Provisional application Ser. No. 17/090,477 filed Nov. 5, 2020 entitled "Remote SIM Provisioning," now U.S. Pat. No. 11,533,605, the entire contents of which are hereby incorporated by reference for all purposes.

BACKGROUND

Long Term Evolution (LTE), fifth generation (5G) new radio (NR), and other recently developed communication technologies allow wireless devices to communicate information at data rates (e.g., in terms of Gigabits per second, etc.) that are orders of magnitude greater than what was available just a few years ago.

Today's communication networks are also more secure, resilient to multipath fading, allow for lower network traffic latencies, provide better communication efficiencies (e.g., in terms of bits per second per unit of bandwidth used, etc.). These and other recent improvements have facilitated the emergence of the Internet of Things (IoT), large scale Machine to Machine (M2M) communication systems, autonomous vehicles, and other technologies that rely on consistent and secure communications.

The growing prevalence of computing devices supporting M2M communications, such as IoT devices, etc., has resulted in the emergence of communication protocols to support M2M communications, such as the Lightweight Machine-to-Machine (LwM2M) protocol as defined by the Open Mobile Alliance (OMA). Additionally, the growth in the number of computing devices supporting M2M communications, such as IoT devices, etc., has increased the number of computing devices having a subscriber identity module (SIM) profile associated with a subscription with a carrier providing wireless communications services for the computing device.

As computing devices supporting M2M communications, such as IoT devices, etc., are often devices, such as appliances, industrial equipment, security equipment, sensors, etc., that operate independent of human interaction, operate in remote or hard to access locations, and/or are produced in fully contained or sealed form factors, the changing of a subscription for a computing device supporting M2M communication, such as an IoT device, etc., from one carrier to another carrier presents challenges. Specifically, updating a SIM profile remotely for a computing device supporting M2M communication, such as an IoT device, etc., presents security concerns in communicating a SIM profile update that current approaches for remote SIM provisioning to a computing device supporting M2M communication, such as an IoT device, etc., have not addressed.

SUMMARY

Various aspects may include methods for supporting remote Subscriber Identity Module (SIM) profile provisioning that may be performed by a processor of a Lightweight Machine-to-Machine (LwM2M) server and/or a processor of a LwM2M client computing device, such as an Internet of Things (IoT) device.

Various aspects may include generating a remote SIM provisioning object for the LwM2M client computing device indicating that the SIM profile update for the LwM2M client computing device is available and sending the remote SIM provisioning object to the LwM2M client computing device.

Some aspects may further include receiving a SIM profile package from a Subscription Manager Data Preparation (SM-DP+) server, and sending the SIM profile package to the LwM2M client computing device in one or more additional remote SIM provisioning objects.

Some aspects may further include, prior to generating the remote SIM provisioning object, determining whether the LwM2M client computing device supports a radio frequency (RF) band associated with the SIM profile update for the LwM2M client computing device, and sending an indication to a mobile network operator server of a SIM profile update error in response to determining that the LwM2M client computing device does not support a RF band associated with the SIM profile update for the LwM2M client computing device. In some aspects, generating the remote SIM provisioning object may include generating the remote SIM provisioning object in response to determining that the LwM2M client computing device does support a RF band associated with the SIM profile update for the LwM2M client computing device.

Some aspects may further include, prior to generating the remote SIM provisioning object, determining whether free memory space for a SIM of the LwM2M client computing device is equal to or greater than a memory requirement for the SIM profile update for the LwM2M client computing device, and sending an indication to a mobile network operator server of a SIM profiled update error in response to determining that the free memory space for the SIM is less than the memory requirement for the SIM profile update for the LwM2M client computing device. In some aspects, generating the remote SIM provisioning object may include generating the remote SIM provisioning object in response to determining that the free memory space for the SIM is equal to or greater than the memory requirement for the SIM profile update for the LwM2M client computing device.

In some aspects, sending the remote SIM provisioning object to the LwM2M client computing device may include sending the remote SIM provisioning object to the LwM2M client computing device using a secure connection.

Some aspects may further include determining whether a second remote SIM provisioning object from the LwM2M client computing device indicating that a SIM profile package was successfully downloaded by the LwM2M client computing device was received, generating a third remote SIM provisioning object for the LwM2M client computing device including a profile update trigger indication in response to determining that the second remote SIM provisioning object from the LwM2M client computing device was received, and sending the third remote SIM provisioning object to the LwM2M client computing device.

Various aspects may include receiving a remote SIM provisioning object from a LwM2M server indicating that a SIM profile update for the LwM2M client computing device is available, and downloading the SIM profile update in response to receiving the remote SIM provisioning object.

In some aspects, downloading the SIM profile update may include receiving a SIM profile package from a SM-DP+ server in one or more additional remote SIM provisioning objects from the LwM2M server.

In some aspects, the LwM2M client computing device may be an Internet of Things (IoT) device.

Further aspects include a computing device, such as an IoT device, having a processor configured with processor-executable instructions to perform operations of any of the LwM2M client methods summarized above. Further aspects include a computing device, such as an IoT device, having means for performing functions of any of the LwM2M client methods summarized above. Further aspects include a non-transitory processor-readable medium having stored thereon processor-executable instructions configured to cause a processor of a computing device, such as an IoT device, to perform operations of any of the LwM2M client methods summarized above. Further aspects include a server having a processor configured with processor-executable instructions to perform operations of any of the LwM2M server methods summarized above. Various aspects include a server having means for performing functions of any of the LwM2M server methods summarized above. Various aspects include a non-transitory processor-readable medium having stored thereon processor-executable instructions configured to cause a processor of a server to perform operations of any of the LwM2M server methods summarized above.

BRIEF DESCRIPTION OF THE DRAWINGS

The accompanying drawings, which are incorporated herein and constitute part of this specification, illustrate exemplary embodiments of the claims, and together with the general description given above and the detailed description given below, serve to explain the features of the claims.

FIG. 3B is an example of a remote SIM provisioning object suitable for implementing various embodiments.

DETAILED DESCRIPTION

Figure 1:
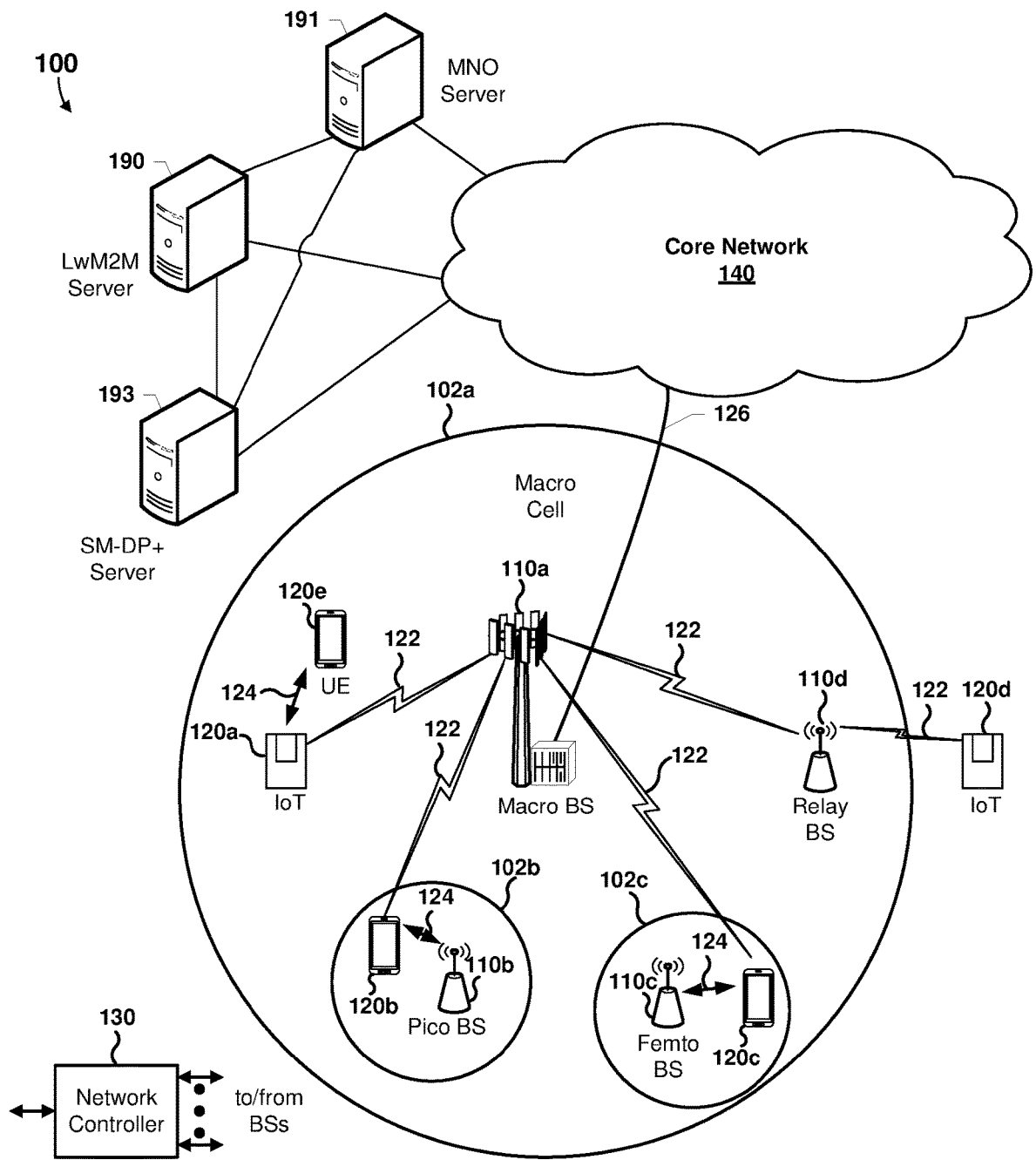
FIG. 1 is a system block diagram conceptually illustrating an example communications system.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments provide methods for supporting remote Subscriber Identity Module (SIM) profile provisioning that may be performed by a processor of a Lightweight Machine-to-Machine (LwM2M) server and/or a processor of a LwM2M client computing device, such as an Internet of Things (IoT) device, smartphone, etc. Various embodiments may include exchanging remote SIM provisioning objects between a LwM2M server and LwM2M client computing device, such as an IoT device, to support SIM profile provisioning to the LwM2M client computing device. The remote provisioning of SIM profiles may enable a carrier of a LwM2M client computing device, such as an IoT device, smartphone, etc., to be changed without user interaction and/or physical access by a user to the LwM2M client computing device. Changing a carrier of a LwM2M client computing device, such as an IoT device, smartphone, etc., without user interaction and/or physical access by a user to the LwM2M client computing device may save money and/or provide flexibility in operation of the LwM2M client computing device. Some embodiments may enable a mobile network operator (MNO) to provision a SIM profile package remotely to a LwM2M client computing device without sending the SIM profile package to a Subscription Manager Data Preparation (SM-DP+) server as required in the Remote SIM Provisioning (RSP) Technical Specification as defined by the Global System for Mobile Communications (GSM) Association (GSMA).

Some embodiments may enable a SIM profile package to be remotely provisioned to an LwM2M client computing device from an SM-DP+ server via an LwM2M server. The provisioning of a SIM profile package from an SM-DP+ server to an LwM2M server and on to an LwM2M client device may ensure secure connections, such as Datagram Transport Layer Security (DTLS) connections, Transport Layer Security (TLS) connections, etc., may be used for provisioning the SIM profile package to an LwM2M client device. Additionally, the provisioning of a SIM profile package from an SM-DP+ server to an LwM2M server and on to an LwM2M client device may enable an LwM2M client device to receive a SIM profile package from an SM-DP+ server without needing to implement a client side SM-DP+ protocol at the LwM2M client device. Various embodiments may enable original equipment manufacturers (OEMs) to switch carriers for a LwM2M client computing device, such as an IoT device, smartphone, etc.

The terms "wireless device", "user equipment" (UE), and "UE computing device" are used herein to refer to any one or all of cellular telephones, smartphones, portable computing devices, personal or mobile multi-media players, laptop computers, tablet computers, smartbooks, ultrabooks, palmtop computers, wireless electronic mail receivers, multimedia Internet-enabled cellular telephones, wireless router devices, wireless appliances, medical devices and equipment, entertainment devices (e.g., wireless gaming controllers, music and video players, satellite radios, etc.), wireless communication elements within autonomous and semiautonomous vehicles, wireless devices affixed to or incorporated into various mobile platforms, and similar electronic devices that include a memory, one or more SIMs, wireless communication components and a programmable processor.

The term "IoT device" is used herein to refer to any of a variety of devices including a processor and transceiver for communicating with other devices or a network. For ease of description, examples of IoT devices are described as communicating via radio frequency (RF) wireless communication links, but IoT devices may communicate via wired or wireless communication links with another device (or user), for example, as a participant in a communication network, such as the IoT. Such communications may include communications with another wireless device, a base station (including a cellular communication network base station and an IoT base station), an access point (including an IoT access point), or other wireless devices.

Various embodiments may be implemented in any device, system or network that is capable of transmitting and receiving RF signals according to any of the Institute of Electrical and Electronics Engineers (IEEE)16.11 standards, or any of the IEEE 802.11 standards, the Bluetooth® standard, code division multiple access (CDMA), CDMA-2000, frequency division multiple access (FDMA), time division multiple access (TDMA), time division synchronous code division multiple access (TD-SCDMA), Global System for Mobile communications (GSM), GSM/General Packet Radio Service (GPRS), Enhanced Data GSM Environment (EDGE)(also known as Enhanced GPRS (EGPRS)), Terrestrial Trunked Radio (TETRA), Wideband-CDMA (WCDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IoT) network, such as an IEEE 802.15.4 protocol (for example, Thread, ZigBee, and Z-Wave), 6LoWPAN, Bluetooth Low Energy (BLE), LTE Machine-Type Communication (LTE MTC), Narrow Band LTE (NB-LTE), Cellular IoT (CIoT), Narrow Band IoT (NB-IoT), BT Smart, Wi-Fi, LTE-U, LTE-Direct, MuLTEfire, as well as relatively extended-range wide area physical layer interfaces (PHYs) such as Random Phase Multiple Access (RPMA), Ultra Narrow Band (UNB), Low Power Long Range (LoRa), Low Power Long Range Wide Area Network (LoRaWAN), Weightless, Worldwide Interoperability for Microwave Access (WiMAX), or a system utilizing 3G, 4G or 5G, or further implementations thereof, technology.

The term "system on chip" (SOC) is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "system in a package" (SIP) is used herein to refer to a single module or package that contains multiple resources, computational units, cores and/or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP may also include multiple independent SOCs coupled together via high speed communication circuitry and packaged in close proximity, such as on a single motherboard or in a single IoT device. The proximity of the SOCs facilitates high speed communications and the sharing of memory and resources.

As used herein, the terms "SIM," "SIM card," and "subscriber identity module" may interchangeably refer to a memory that may be an integrated circuit or embedded into a removable card, and that stores an International Mobile Subscriber Identity (IMSI), related key, and/or other information used to identify and/or authenticate a wireless device on a network and enable a communication service with the network. Examples of SIMs include the Universal Subscriber Identity Module (USIM) provided for in the Long Term Evolution (LTE) 3GPP standard, and the Removable User Identity Module (R-UIM) provided for in the 3GPP standard. Universal Integrated Circuit Card (UICC), embedded UICC (eUICC), integrated SIM (iSIM), and integrated UICC (iUICC) are other terms for SIM. Moreover, a SIM may also refer to a virtual SIM (VSIM), which may be implemented as a remote SIM profile loaded in an application on a wireless device, and enabling normal SIM functions on the wireless device.

Because the information stored in a SIM enables the wireless device to establish a communication link for a particular communication service or services with a particular network, the term "SIM" is also be used herein as a shorthand reference to the communication service associated with and enabled by the information stored in a particular SIM as the SIM and the communication network, as well as the services and subscriptions supported by that network, correlate to one another. Similarly, the term SIM may also be used as a shorthand reference to the protocol stack and/or modem stack and communication processes used in establishing and conducting communication services with subscriptions and networks enabled by the information stored in a particular SIM.

Various embodiments are described herein using the term "server" to refer to any computing device capable of functioning as a server, such as a master exchange server, web server, mail server, document server, content server, or any other type of server. A server may be a dedicated computing device or a computing device including a server module (e.g., running an application that may cause the computing device to operate as a server). A server module (e.g., server application) may be a full function server module, or a light or secondary server module (e.g., light or secondary server application) that is configured to provide synchronization services among the dynamic databases on receiver devices. A light server or secondary server may be a slimmed-down version of server-type functionality that can be implemented on a receiver device thereby enabling it to function as an Internet server (e.g., an enterprise e-mail server) only to the extent necessary to provide the functionality described herein.

As used herein, the terms "network," "system," "wireless network," "cellular network," and "wireless communication network" may interchangeably refer to a portion or all of a wireless network of a carrier associated with a wireless device and/or subscription on a wireless device. The techniques described herein may be used for various wireless communication networks, such as Code Division Multiple Access (CDMA), time division multiple access (TDMA), FDMA, orthogonal FDMA (OFDMA), single carrier FDMA (SC-FDMA) and other networks. In general, any number of wireless networks may be deployed in a given geographic area. Each wireless network may support at least one radio access technology, which may operate on one or more frequency or range of frequencies. For example, a CDMA network may implement Universal Terrestrial Radio Access (UTRA) (including Wideband Code Division Multiple Access (WCDMA) standards), CDMA2000 (including IS-2000, IS-95 and/or IS-856 standards), etc. In another example, a TDMA network may implement GSM Enhanced Data rates for GSM Evolution (EDGE). In another example, an OFDMA network may implement Evolved UTRA (E-UTRA) (including LTE standards), IEEE 802.11 (WiFi), IEEE 802.16 (WiMAX), IEEE 802.20, Flash-OFDM®, etc. Reference may be made to wireless networks that use LTE standards, and therefore the terms "Evolved Universal Terrestrial Radio Access," "E-UTRAN" and "eNodeB" may also be used interchangeably herein to refer to a wireless network. However, such references are provided merely as examples, and are not intended to exclude wireless networks that use other communication standards. For example, while various Third Generation (3G) systems, Fourth Generation (4G) systems, and Fifth Generation (5G) systems are discussed herein, those systems are referenced merely as examples and future generation systems (e.g., sixth generation (6G) or higher systems) may be substituted in the various examples.

The terms "network operator," "operator," "mobile network operator," "carrier," and "service provider" are used interchangeably herein to describe a provider of wireless communications services that owns or controls elements to sell and deliver communication services to an end user, and provides necessary provisioning and credentials as policies implemented in user device subscriptions.

The term "LwM2M client computing device" is used herein to refer to any wireless device that uses the an LwM2M protocol, such as the LwM2M protocol defined according to the Open Mobile Alliance (OMA) LwM2M specification, to communicate with another device operating as a LwM2M server. A LwM2M client computing device may include a LwM2M client component running on a processor of the LwM2M client computing device implementing client-side operations according to an LwM2M protocol, such as the LwM2M protocol defined according to the OMA LwM2M specification, for interacting with a LwM2M server.

The term "LwM2M server" is used herein to refer to any computing device that uses the an LwM2M protocol, such as the LwM2M protocol defined according to the OMA LwM2M specification, to communicate with a LwM2M client computing device. A LwM2M server may include a LwM2M server component running on a processor of the LwM2M server implementing server-side operations according to an LwM2M protocol, such as the LwM2M protocol defined according to the OMA LwM2M specification, for interacting with a LwM2M client computing device.

The LwM2M protocol, such as the LwM2M protocol defined according to the OMA LwM2M specification, defines various LwM2M objects that may include one or more resource definition information elements (IE). For example, the LwM2M protocol defines a security object (Object ID=0), a server object (Object ID=1), an access control object (Object ID=2), a device object (Object ID=3), a connectivity monitoring object (Object ID=4), and a firmware update object (Object ID=5).

Various embodiments may provide a LwM2M object, such as a remote SIM provisioning object, that enables a SIM profile for a LwM2M client computing device, such as an IoT device, to be updated to a new operator's SIM profile. In various embodiments, a remote SIM provisioning object may be a LwM2M object that indicates that a SIM profile update for a LwM2M client computing device, such as an IoT device, is available. In various embodiments, a remote SIM provisioning object may be communicated between a LwM2M client computing device, such as an IoT device, and a LwM2M server to supporting remote SIM profile provisioning to the LwM2M client computing device. As LwM2M connections between a LwM2M server and a LwM2M client computing device, such as an IoT device, may be secure connections, such as Datagram Transport Layer Security (DTLS) connections, Transport Layer Security (TLS) connections, etc., various embodiments may enable a LwM2M client computing device to connect to any LwM2M server to obtain a remote SIM provisioning object via a secure connection.

In various embodiments, an MNO server may send an indication of a SIM profile update for a LwM2M client computing device, such as an IoT device, to a LwM2M server. The indication of the SIM profile update for the LwM2M client computing device, such as the IoT device, may be sent directly from the MNO server to the LwM2M server. In this manner, the MNO server may avoid communicating with a SM-DP+ server as required in the RSP Technical Specification and indicate a SIM profile update is to occur for the LwM2M client computing device directly to the LwM2M server.

In some embodiments, the indication of the SIM profile update for the LwM2M client computing device from the MNO server may include one or more addresses at which a SIM profile package from the MNO server is available for download by the LwM2M client computing device. As examples, the addresses may be one or more Uniform Resource Indicators (URIs), one or more Uniform Resource Locators (URLs), etc. In this manner, the addresses may act as pointers to devices from which the LwM2M client computing device may download a SIM profile package. As used herein, a "SIM profile package" may be a data file formatted to be stored and executed by a processor of a LwM2M client device to install and/or update a SIM profile on the LwM2M client device. The addresses may be addresses associated with the MNO server itself and/or address associated with servers other than the MNO server, such as a SIM profile package server. The one or more addresses may enable a LwM2M client device to pull a SIM profile package from the MNO server and/or another server, such as a SIM profile package server.

In some embodiments, the MNO server may send a SIM profile package to an LwM2M server. The SIM profile package may be sent in addition to including one or more addresses at which the SIM profile package from the MNO server is available for download by the LwM2M client computing device in the indication of the SIM profile update for the LwM2M client computing device sent from the MNO server to the LwM2M server. Alternatively, the SIM profile package may be sent in place of including one or more addresses at which the SIM profile package from the MNO server is available for download by the LwM2M client computing device in the indication of the SIM profile update for the LwM2M client computing device sent from the MNO server to the LwM2M server. The provisioning of the SIM profile package by the MNO server to the LwM2M server may enable the LwM2M server to push the SIM profile package to a LwM2M client computing device, such as an IoT device, by sending the SIM profile package to the LwM2M client computing device in one or more remote SIM provisioning objects.

In various embodiments, LwM2M client computing devices and/or LwM2M servers may generate and send/receive remote SIM provisioning objects to/from one another to exchange information and/or instructions associated with remote SIM profile provisioning. In some embodiments, a remote SIM provisioning object may include various information elements (IEs) to indicate information and/or instructions associated with remote SIM profile provisioning. In some embodiments, in response to the information and/or instructions indicated in a received remote SIM provisioning object, such as information and/or instructions indicated in one or more IEs of a received remote SIM provisioning object, a LwM2M client computing device and/or LwM2M server may take various actions associated with remote SIM profile provisioning.

In some embodiments, a remote SIM provisioning object may include information indicating the one or more RF bands supported by a LwM2M client computing device, such as an IoT device. For example, the remote SIM provisioning object may include a list of supported LTE bands, a list of supported EGPRS bands, a list of supported TD-SCDMA bands, a list of supported WCDMA bands, a list of supported WiMax bands, a list of supported NB-IoT bands, and/or a list of supported 5G bands. A LwM2M client computing device, such as an IoT device, may send the remote SIM provisioning object to a LwM2M server to notify the LwM2M server of the LwM2M client computing device's supported RF bands. In some embodiments, in response to receiving an indication of the SIM profile update for the LwM2M client computing device from an MNO server, a LwM2M server may determine whether the LwM2M client computing device supports a RF band associated with the SIM profile update for the LwM2M client computing device. In response to determining the LwM2M client does not support a RF band associated with the SIM profile update, the LwM2M server may send an indication to the MNO server of a SIM profile update error. In this manner, a check may be performed by the LwM2M server to ensure the LwM2M client computing device can support coverage for a future operator associated with the SIM profile update.

In some embodiments, a remote SIM provisioning object may include information indicating a SIM profile update protocol supported by a LwM2M client computing device, such as a IoT device. SIM profile update protocols may be communication protocols a LwM2M client computing device, such as a IoT device, is configured to use to retrieve a SIM profile package. Examples of SIM profile update protocols may include the Constrained Application Protocol (CoAP), the secured-CoAP (CoAPs), Hypertext Transfer Protocol (HTTP) 1.1, HTTP Secure (HTTPS) 1.1, or any other suitable communication protocol. A LwM2M client computing device, such as an IoT device, may send the remote SIM provisioning object to a LwM2M server to notify the LwM2M server of the LwM2M client computing device's supported SIM profile update protocols. In some embodiments, in response to receiving an indication of the SIM profile update for the LwM2M client computing device from an MNO server including one or more addresses at which a SIM profile package from the MNO server is available for download by the LwM2M client computing device, a LwM2M server may determine whether a SIM profile update protocol supported by the LwM2M client computing device. The LwM2M server may select one of the one or more addresses based at least in part on the SIM profile update protocol supported by the LwM2M client computing device. In this manner, the LwM2M server may ensure the address, such as a URI, selected for the LwM2M client computing device is of a format supported by the LwM2M client computing device. As a specific example, in a scenario in which the LwM2M client computing device sends a remote SIM provisioning object to the LwM2M server indicating only CoAP is supported, the LwM2M server may ensure a CoAP URI is selected for sending to the LwM2M client computing device and not a HTTP URI as the LwM2M client computing device may not support HTTP.

In some embodiments, a remote SIM provisioning object may include information indicating a SIM profile update delivery method supported by a LwM2M client computing device, such as a IoT device. For example, a LwM2M client computing device may support a pull delivery method in which the LwM2M client computing device is capable of requesting a SIM profile package from an address, such as a specific URI. As another example, a LwM2M client computing device may support a push delivery method in which the LwM2M client computing device receives a SIM profile package from the LwM2M server in one or more remote SIM provisioning objects. Additionally, some LwM2M client computing devices may support both push and pull delivery methods. In some embodiments, a remote SIM provisioning object may include information indicating that a LwM2M client computing device supports only pull delivery, only push delivery, or both push and pull delivery. In scenarios in which a LwM2M client computing device supports only pull delivery, the LwM2M server may provide an address, such as a URI, from which the SIM profile package may be downloaded. In scenarios in which a LwM2M client computing device supports only push delivery, the LwM2M server may send one or more remote SIM provisioning objects including the SIM profile package as a resource within the remote SIM provisioning objects. In scenarios in which a LwM2M client computing device supports both push and pull delivery, the LwM2M server may select one or both delivery methods (e.g., the LwM2M server may send one or more remote SIM provisioning objects including the SIM profile package as a resource within the remote SIM provisioning objects and/or the LwM2M server may provide an address, such as a URI, from which the SIM profile package may be downloaded).

In some embodiments, a remote SIM provisioning object may include information indicating an amount (or size) of free memory space for a SIM of the LwM2M client computing device. For example, the free memory space may be indicated as a value in kilo-bytes of an estimated available amount of storage space on a SIM of the LwM2M client computing device. A LwM2M client computing device, such as an IoT device, may send the remote SIM provisioning object to a LwM2M server to notify the LwM2M server of an amount (or size) of free memory space for a SIM of the LwM2M client computing device. In some embodiments, in response to receiving an indication of the SIM profile update for the LwM2M client computing device from an MNO server, a LwM2M server may whether free memory space for a SIM of the LwM2M client computing device is equal to or greater than a memory requirement for the SIM profile update for the LwM2M client computing device. In response to determining that the free memory space for the SIM is less than the memory requirement for the SIM profile update for the LwM2M client computing device, the LwM2M server may send an indication to the MNO server of a SIM profile update error. In this manner, a check may be performed by the LwM2M server to ensure the LwM2M client computing device has sufficient memory to support the SIM profile update. In some embodiments, a remote SIM provisioning object may include information indicating a total memory space for a SIM of the LwM2M client computing device.

In some embodiments, a remote SIM provisioning object may include information indicating a current service provider name for the LwM2M client computing device. As examples, the current service provider name may be indicated as a Mobile Network Code (MNC), a Mobile Country Code (MCC) and MNC pairing (e.g., a Public Land Mobile Network (PLMN) identifier (ID)), another type code, a text string, etc. In some embodiments, a remote SIM provisioning object may include information indicating a current SIM type of the LwM2M client computing device. As examples, the SIM type may be indicated as a full size SIM, mini size SIM, micro SIM, nano SIM, USIM, embedded-SIM (eSIM), UICC, soft SIM, thin SIM, embedded UICC (eUICC), integrated SIM (iSIM), integrated UICC (iUICC), etc. In some embodiments, a remote SIM provisioning object may include information indicating one or more supported SIM type of the LwM2M client computing device. As examples, the one or more supported SIM types may be indicated as full size SIM, mini size SIM, micro SIM, nano SIM, USIM, eSIM, UICC, soft SIM, thin SIM, eUICC, iSIM, iUICC, etc.

In some embodiments, a remote SIM provisioning object may include information indicating a profile package name and/or a profile package version. For example, a LwM2M server may indicate a profile name and/or a profile version number of a SIM profile package sent to, and/or to be sent to, a LwM2M client computing device, such as an IoT device.

In some embodiments, a remote SIM provisioning object may include a profile update trigger indication. The profile update trigger indication may be an IE of a remote SIM provisioning object that when present triggers a receiving LwM2M client computing device, such as IoT device, to update a SIM profile. The profile update trigger indication may be an executable code or code fragment that may be executable by the LwM2M client computing device to update a SIM profile using a previously successfully downloaded SIM profile package. In some embodiments, the remote SIM provisioning object including the profile update trigger indication may be sent in response to receiving an indication from a LwM2M client computing device that a SIM profile package was successfully downloaded.

In some embodiments, a remote SIM provisioning object may include a state indication of an LwM2M client computing device relative to a SIM profile package. As examples, a LwM2M client computing device may be in an idle state before a SIM profile package is downloaded or after successful updating of a SIM profile, a LwM2M client computing device may be in a downloading state while data for a SIM profile package is inbound to the LwM2M client computing device and before download is successfully completed, a LwM2M client computing device may be in a downloaded state after download of a SIM profile package is successfully completed and before an update is triggered, and LwM2M client computing device may be in a downloaded state after an update is triggered and before the successful update of a SIM profile is complete. In some embodiments, the indication of the state of the LwM2M client computing device in the remote SIM provisioning object may be used by a LwM2M server to control provisioning of a SIM profile update. For example, a LwM2M server may only send a remote SIM provisioning object including a profile update trigger indication in response to the LwM2M client computing device reporting its state as downloaded.

In some embodiments, a remote SIM provisioning object may include an update result indication. The update result indication may be an indication of the result of attempting download of a SIM profile package and/or the result of an attempted update of a SIM profile using a downloaded SIM profile package. For example, the update result indication may indicate the profile was updated successfully, may indicate not enough SIM memory was available for the new SIM profile package, may indicate the LwM2M client computing device ran out of random access memory (RAM) during the download process, may indicate a connection was lost during the download process, may indicate an integrity check for a SIM profile package failed, may indicate a SIM profile package was of an unsupported package type, may indicate an address, such as a URI, associated with a SIM profile package was invalid, may indicate a SIM profile update protocol used was not supported, may indicate a failure to retrieve a SIM profile package from an address (e.g., a URI), etc.

In some embodiments, a remote SIM provisioning object may include an integrated circuit card identifier (ICCID). The ICCID may be an indication of a unique identification number for the UICC and/or smart cards of the LwM2M client computing device. In some embodiments, a remote SIM provisioning object may include an eUICC identifier (ID). The eUICC ID may be the registered identifier of the eUICC of the LwM2M client computing device. In some embodiments, a remote SIM provisioning object may include an indication of a profile type. The profile type may indicate a type of a SIM profile and may be MNO defined.

In some embodiments, reboot of a LwM2M client computing device may be required after updating a SIM profile. In some embodiments, once a new SIM profile is successfully installed and/or updated on a LwM2M client computing device, a profile package version indication in a remote SIM provisioning object sent from the LwM2M client computing device to the LwM2M server may be updated to the newest version number. In some embodiments, once a new SIM profile is successfully installed and/or updated on a LwM2M client computing device, a provider name indication in a remote SIM provisioning object sent from the LwM2M client computing device to the LwM2M server may be updated to the provider.

Some embodiments may enable a SIM profile package to be remotely provisioned to an LwM2M client computing device from an SM-DP+ server via a LwM2M server.

In some embodiments, an MNO server may send an indication of a SIM profile update to an LwM2M server and/or an SM-DP+ server. In some embodiments, an SM-DP+ server may forward the indication of a SIM profile update for an LwM2M client computing device received from an MNO server onto an LwM2M server. In some embodiments, an indication of a SIM profile update for an LwM2M client computing device forwarded by an SM-DP+ server may include one or more addresses at which a SIM profile package from an SM-DP+ server may be available for download by an LwM2M server. As examples, the addresses may be one or more URIs, one or more URLs, etc. The addresses may be addresses associated with the SM-DP+ server itself and/or address associated with servers other than the SM-DP+ server, such as a SIM profile package server. The one or more addresses may enable an LwM2M server to pull a SIM profile package from the SM-DP+ server and/or another server, such as a SIM profile package server.

In some embodiments, an SM-DP+ server may send a SIM profile package to an LwM2M server. The SIM profile package may be sent in addition to including one or more addresses at which the SIM profile package from the SM-DP+ server is available for download in the indication of the SIM profile update for an LwM2M client computing device sent from an MNO server to the SM-DP+ server and/or the LwM2M server. Alternatively, the SIM profile package may be sent in place of including one or more addresses at which the SIM profile package from an SM-DP+ server is available for download in the indication of the SIM profile update for an LwM2M client computing device sent from an MNO server to the SM-DP+ server and/or the LwM2M server. Provisioning of a SIM profile package by an SM-DP+ server to an LwM2M server may enable the LwM2M server to push the SIM profile package to an LwM2M client computing device by sending the SIM profile package to the LwM2M client computing device in one or more remote SIM provisioning objects. Provisioning of the SIM profile package by the SM-DP+ server to the LwM2M server followed by the LwM2M server pushing the SIM profile package to the LwM2M client in one or more remote SIM provisioning objects may ensure secure connections, such as DTLS connections, TLS connections, etc., can be used for provisioning the SIM profile package the LwM2M client computing device.

As an example, an LwM2M client computing device need not use unsecure connections to reach an SM-DP+ server to download the SIM profile package directly, as the SIM profile package may be provided to the LwM2M client computing device by the LwM2M server. Additionally, provisioning of the SIM profile package by the SM-DP+ server to the LwM2M server followed by the LwM2M server pushing the SIM profile package to the LwM2M client in one or more remote SIM provisioning objects may enable a LwM2M client computing device to receive a SIM profile package from a SM-DP+ server without needing to implement a client side SM-DP+ protocol at the LwM2M client computing device as the LwM2M client computing device may not need to communicate directly with the SM-DP+ server.

While various examples are discussed herein in relation to IoT devices, IoT devices are merely one example of a LwM2M client computing device that may implement various embodiments, and other devices, such as smartphones, etc., may be substituted for IoT devices in the various examples.

FIG. 1 is a system block diagram illustrating an example communication system 100 suitable for implementing any of the various embodiments. The communications system 100 may be a 5G New Radio (NR) network, or any other suitable network such as an LTE network, 5G network, etc. While FIG. 1 illustrates a 5G network, later generation networks may include the same or similar elements. Therefore, the reference to a 5G network and 5G network elements in the following descriptions is for illustrative purposes and is not intended to be limiting The communications system 100 may include a heterogeneous network architecture that includes a core network 140, a variety of mobile devices (illustrated as wireless device 120a-120e in FIG. 1, labeled as UEs and IoT devices), LwM2M server 190, MNO server 191, and SM-DP+ server 193. The communications system 100 may also include a number of base stations (illustrated as the BS 110a, the BS 110b, the BS 110c, and the BS 110d) and other network entities. A base station is an entity that communicates with wireless devices, and also may be referred to as a Node B, an LTE Evolved nodeB (eNodeB or eNB), an access point (AP), a Radio head, a transmit receive point (TRP), a New Radio base station (NR BS), a 5G NodeB (NB), a Next Generation NodeB (gNodeB or gNB), or the like. Each base station may provide communication coverage for a particular geographic area. In 3GPP, the term "cell" can refer to a coverage area of a base station, a base station Subsystem serving this coverage area, or a combination thereof, depending on the context in which the term is used. The core network 140 may be any type core network, such as an LTE core network (e.g., an Evolved Packet Core (EPC) network), 5G core network, etc.

A base station 110a-110d may provide communication coverage for a macro cell, a pico cell, a femto cell, another type of cell, or a combination thereof. A macro cell may cover a relatively large geographic area (for example, several kilometers in radius) and may allow unrestricted access by mobile devices with service subscription. A pico cell may cover a relatively small geographic area and may allow unrestricted access by mobile devices with service subscription. A femto cell may cover a relatively small geographic area (for example, a home) and may allow restricted access by mobile devices having association with the femto cell (for example, mobile devices in a closed subscriber group (CSG)). A base station for a macro cell may be referred to as a macro BS. A base station for a pico cell may be referred to as a pico BS. A base station for a femto cell may be referred to as a femto BS or a home BS. In the example illustrated in FIG. 1, a base station 110a may be a macro BS for a macro cell 102a, a base station 110b may be a pico BS for a pico cell 102b, and a base station 110c may be a femto BS for a femto cell 102c. A base station 110a-110d may support one or multiple (for example, three) cells. The terms "eNB", "base station", "NR BS", "gNB", "TRP", "AP", "node B", "5G NB", and "cell" may be used interchangeably herein.

In some examples, a cell may not be stationary, and the geographic area of the cell may move according to the location of a mobile base station. In some examples, the base stations 110a-110d may be interconnected to one another as well as to one or more other base stations or network nodes (not illustrated) in the communications system 100 through various types of backhaul interfaces, such as a direct physical connection, a virtual network, or a combination thereof using any suitable transport network.

The base station 110a-110d may communicate with the core network 140 over a wired or wireless communication link 126. The wireless device 120a-120e may communicate with the base station 110a-110d over a wireless communication link 122.

The wired communication link 126 may use a variety of wired networks (e.g., Ethernet, TV cable, telephony, fiber optic and other forms of physical network connections) that may use one or more wired communication protocols, such as Ethernet, Point-To-Point protocol, High-Level Data Link Control (HDLC), Advanced Data Communication Control Protocol (ADCCP), and Transmission Control Protocol/Internet Protocol (TCP/IP).

The communications system 100 also may include relay stations (e.g., relay BS 110d). A relay station is an entity that can receive a transmission of data from an upstream station (for example, a base station or a mobile device) and transmit the data to a downstream station (for example, a wireless device or a base station). A relay station also may be a mobile device that can relay transmissions for other wireless devices. In the example illustrated in FIG. 1, a relay station 110d may communicate with macro the base station 110a and the wireless device 120d in order to facilitate communication between the base station 110a and the wireless device 120d. A relay station also may be referred to as a relay base station, a relay base station, a relay, etc.

The communications system 100 may be a heterogeneous network that includes base stations of different types, for example, macro base stations, pico base stations, femto base stations, relay base stations, etc. These different types of base stations may have different transmit power levels, different coverage areas, and different impacts on interference in communications system 100. For example, macro base stations may have a high transmit power level (for example, 5 to 40 Watts) whereas pico base stations, femto base stations, and relay base stations may have lower transmit power levels (for example, 0.1 to 2 Watts).

A network controller 130 may couple to a set of base stations and may provide coordination and control for these base stations. The network controller 130 may communicate with the base stations via a backhaul. The base stations also may communicate with one another, for example, directly or indirectly via a wireless or wireline backhaul.

The wireless devices 120a, 120b, 120c may be dispersed throughout communications system 100, and each wireless device may be stationary or mobile. A wireless device also may be referred to as an access terminal, a terminal, a mobile station, a subscriber unit, a station, user equipment (UE), an IoT device, etc.

A macro base station 110a may communicate with the communication network 140 over a wired or wireless communication link 126. The wireless device 120a, 120b, 120c may communicate with a base station 110a-110d over a wireless communication link 122.

The wireless communication links 122, 124 may include a plurality of carrier signals, frequencies, or frequency bands, each of which may include a plurality of logical channels. The wireless communication links 122 and 124 may utilize one or more Radio access technologies (RATs). Examples of RATs that may be used in a wireless communication link include 3GPP LTE, 3G, 4G, 5G (e.g., NR), GSM, CDMA, WCDMA, Worldwide Interoperability for Microwave Access (WiMAX), Time Division Multiple Access (TDMA), and other mobile telephony communications technologies cellular RATs. Further examples of RATs that may be used in one or more of the various wireless communication links 122, 124 within the communication system 100 include medium range protocols such as Wi-Fi, LTE-U, LTE-Direct, LAA, MuLTEfire, and relatively short range RATs such as ZigBee, Bluetooth, and Bluetooth Low Energy (LE).

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum Resource allocation (called a "resource block") may be 12 subcarriers (or 180 kHz). Consequently, the nominal Fast File Transfer (FFT) size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 Resource blocks), and there may be 1, 2, 4, 8 or 16 subbands for system bandwidth of 1.25, 2.5, 5, 10 or 20 MHz, respectively.

While descriptions of some embodiments may use terminology and examples associated with LTE technologies, some embodiments may be applicable to other wireless communications systems, such as a new Radio (NR) or 5G network. NR may utilize OFDM with a cyclic prefix (CP) on the uplink (UL) and downlink (DL) and include support for half-duplex operation using time division duplex (TDD). A single component carrier bandwidth of 100 MHz may be supported. NR Resource blocks may span 12 sub-carriers with a subcarrier bandwidth of 75 kHz over a 0.1 millisecond (ms) duration. Each Radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. Multiple Input Multiple Output (MIMO) transmissions with precoding may also be supported. MIMO configurations in the DL may support up to eight transmit antennas with multi-layer DL transmissions up to eight streams and up to two streams per wireless device. Multi-layer transmissions with up to 2 streams per wireless device may be supported. Aggregation of multiple cells may be supported with up to eight serving cells. Alternatively, NR may support a different air interface, other than an OFDM-based air interface.

Some mobile devices may be considered machine-type communication (MTC) or Evolved or enhanced machine-type communication (eMTC) mobile devices. MTC and eMTC mobile devices include, for example, robots, drones, remote devices, sensors, meters, monitors, location tags, etc., that may communicate with a base station, another device (for example, remote device), or some other entity. A wireless node may provide, for example, connectivity for or to a network (for example, a wide area network such as Internet or a cellular network) via a wired or wireless communication link. Some mobile devices may be considered Internet-of-Things (IoT) devices or may be implemented as NB-IoT (narrowband internet of things) devices. A wireless device 120a-e may be included inside a housing that houses components of the wireless device, such as processor components, memory components, similar components, or a combination thereof. The wireless devices 120a-e may be LwM2M client computing devices.

In general, any number of communication systems and any number of wireless networks may be deployed in a given geographic area. Each communications system and wireless network may support a particular Radio access technology (RAT) and may operate on one or more frequencies. A RAT also may be referred to as a Radio technology, an air interface, etc. A frequency also may be referred to as a carrier, a frequency channel, etc. Each frequency may support a single RAT in a given geographic area in order to avoid interference between communications systems of different RATs. In some cases, 4G/LTE and/or 5G/NR RAT networks may be deployed.

In some embodiments, two or more wireless devices 120a-e (for example, illustrated as the wireless device 120a and the wireless device 120e) may communicate directly using one or more sidelink channels 124 (for example, without using a base station 110a-110d as an intermediary to communicate with one another). For example, wireless device 120a-e may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), a mesh network, or similar networks, or combinations thereof. In this case, the wireless device 120a-e may perform scheduling operations, resource selection operations, as well as other operations described elsewhere herein as being performed by the base station 110a.

The LwM2M server 190 may connect to the core network 140 and/or be a part of the core network 140. The LwM2M server 190 may communicate via the core network 140 and base stations 110a-110d with the wireless devices 120a-e using an LwM2M protocol, such as the LwM2M protocol defined according to the OMA LwM2M specification. The communications between the LwM2M server 190 and wireless devices 120a-e may be via secure connections, such as DTLS connections, TLS connections, etc. The LwM2M server 190 may be configured to exchange remote SIM provisioning objects with the wireless devices 120a-e via communication connections, such as secure connections (e.g., DTLS connections, TLS connections, etc.), therebetween.

The LwM2M server 190 may connect to an MNO server 191 via the core network 140 and/or outside the core network 140. The MNO server 191 may be configured to provide indications of SIM profile updates for LwM2M client computing devices, such as wireless devices 120a-e, and/or SIM profile packages, to the LwM2M server 190. In some configurations, the MNO server 191 may communicate via the core network 140 and base stations 110a-110d with the wireless devices 120a-e. For example, the MNO server 191 may receive and respond to requests for a SIM profile package from the wireless devices 120a-e.

The LwM2M server 190 may connect to an SM-DP+ server 193 via the core network 140 and/or a network outside the core network 140. The SM-DP+ server 193 may be configured to provide SIM profile packages to the LwM2M server 190. The SM-DP+ server 193 may connect to the MNO server 191 via the core network 140 and/or a network outside the core network 140. In some configurations, the SM-DP+ server 193 may communicate with the MNO server 191. For example, the MNO server 191 may send SIM profile packages for the wireless devices 120a-e to the SM-DP+ server 193.

Figure 2:
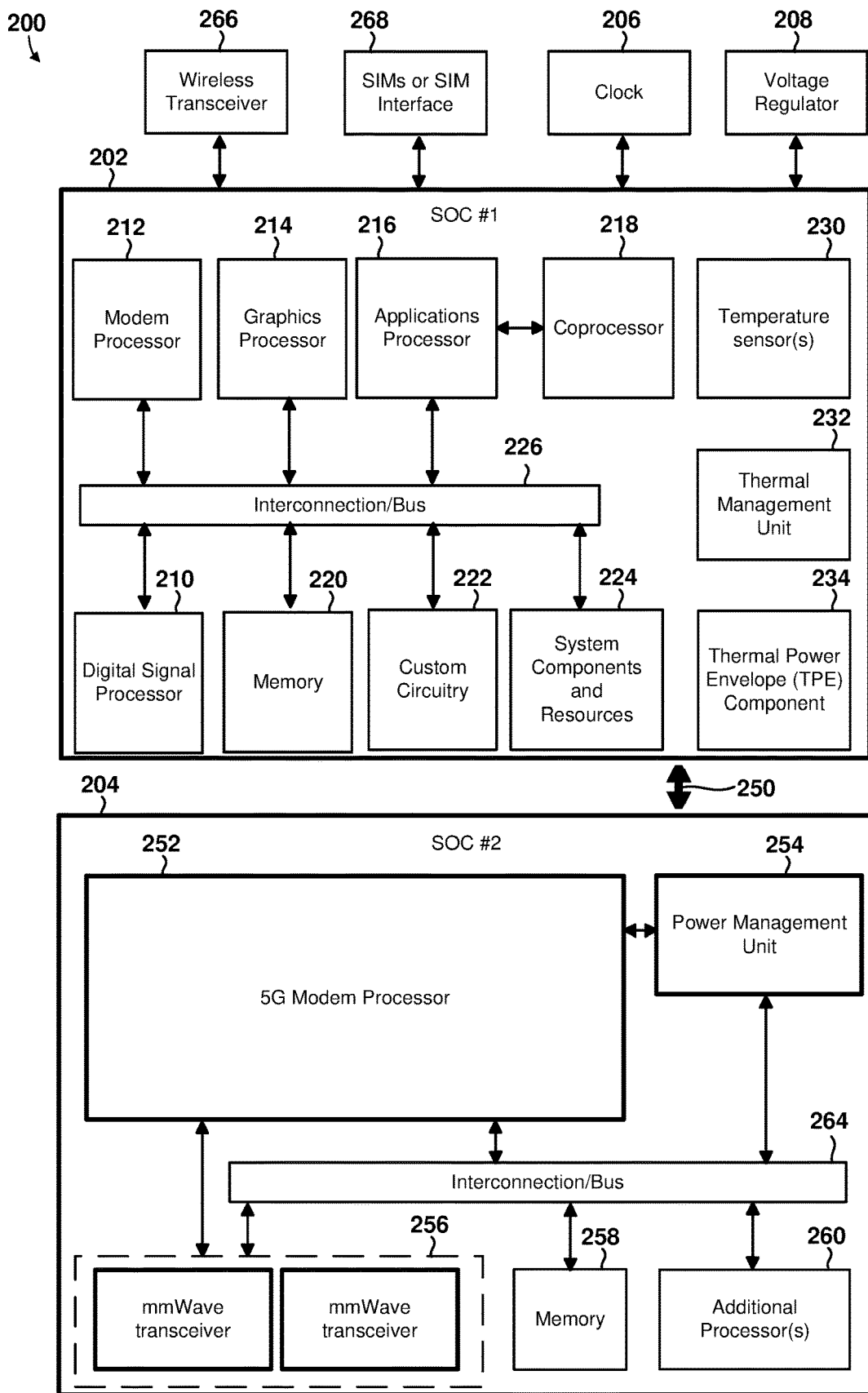
FIG. 2 is a component block diagram illustrating components of an example computing system that may be configured to implement remote Subscriber Identity Module (SIM) profile provisioning in accordance with various embodiments.

FIG. 2 illustrates an example wireless modem system 200 that may be used in IoT devices (e.g., the IoT devices 120a-e) implementing the various embodiments. Various embodiments may be implemented on a number of single processor and multiprocessor computer systems, including a system-on-chip (SOC) or system in a package (SIP).

With reference to FIGS. 1 and 2, the illustrated example wireless device 200 (which may be a SIP in some embodiments) includes a two SOCs 202, 204 coupled to a clock 206, a voltage regulator 208, at least one SIM 268 and/or a SIM interface and a wireless transceiver 266 configured to send and receive wireless communications via an antenna (not shown) to/from network wireless devices, such as a base station 110a. In some embodiments, the first SOC 202 operate as central processing unit (CPU) of the wireless device that carries out the instructions of software application programs by performing the arithmetic, logical, control and input/output (I/O) operations specified by the instructions. In some embodiments, the second SOC 204 may operate as a specialized processing unit. For example, the second SOC 204 may operate as a specialized 5G processing unit responsible for managing high volume, high speed (e.g., 5 Gbps, etc.), and/or very high frequency short wave length (e.g., 28 GHz mmWave spectrum, etc.) communications.

The first SOC 202 may include a digital signal processor (DSP) 210, a modem processor 212, a graphics processor 214, an application processor (AP) 216, one or more coprocessors 218 (e.g., vector co-processor) connected to one or more of the processors, memory 220, custom circuitry 222, system components and resources 224, an interconnection/bus module 226, one or more temperature sensors 230, a thermal management unit 232, and a thermal power envelope (TPE) component 234. The second SOC 204 may include a 5G modem processor 252, a power management unit 254, an interconnection/bus module 264, the plurality of mmWave transceivers 256, memory 258, and various additional processors 260, such as an applications processor, packet processor, etc.

Each processor 210, 212, 214, 216, 218, 252, 260 may include one or more cores, and each processor/core may perform operations independent of the other processors/cores. For example, the first SOC 202 may include a processor that executes a first type of operating system (e.g., FreeBSD, LINUX, OS X, etc.) and a processor that executes a second type of operating system (e.g., MICROSOFT WINDOWS 10). In addition, any or all of the processors 210, 212, 214, 216, 218, 252, 260 may be included as part of a processor cluster architecture (e.g., a synchronous processor cluster architecture, an asynchronous or heterogeneous processor cluster architecture, etc.).

The first and second SOC 202, 204 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 224 of the first SOC 202 may include power amplifiers, voltage regulators, oscillators, phase-locked loops, peripheral bridges, data controllers, memory controllers, system controllers, access ports, timers, and other similar components used to support the processors and software clients running on a wireless device. The system components and resources 224 and/or custom circuitry 222 may also include circuitry to interface with peripheral devices, such as cameras, electronic displays, wireless communication devices, external memory chips, etc.

The first and second SOC 202, 204 may communicate via interconnection/bus module 250. The various processors 210, 212, 214, 216, 218, may be interconnected to one or more memory elements 220, system components and resources 224, and custom circuitry 222, and a thermal management unit 232 via an interconnection/bus module 226. Similarly, the processor 252 may be interconnected to the power management unit 254, the mmWave transceivers 256, memory 258, and various additional processors 260 via the interconnection/bus module 264. The interconnection/bus module 226, 250, 264 may include an array of reconfigurable logic gates and/or implement a bus architecture (e.g., CoreConnect, AMBA, etc.). Communications may be provided by advanced interconnects, such as high-performance networks-on chip (NoCs).

The first and/or second SOCs 202, 204 may further include an input/output module (not illustrated) for communicating with resources external to the SOC, such as a clock 206, a voltage regulator 208, one or more wireless transceivers 266, and at least one SIM 268 and/or SIM interface (i.e., an interface for receiving one or more SIM cards). Resources external to the SOC (e.g., clock 206, voltage regulator 208) may be shared by two or more of the internal SOC processors/cores. The at least one SIM 268 (or one or more SIM cards coupled to one or more SIM interfaces) may store information supporting multiple subscriptions, including a first 5GNR subscription and a second 5GNR subscription, etc.

In addition to the example SIP 200 discussed above, various embodiments may be implemented in a wide variety of computing systems, which may include a single processor, multiple processors, multicore processors, or any combination thereof.

Figure 3A:
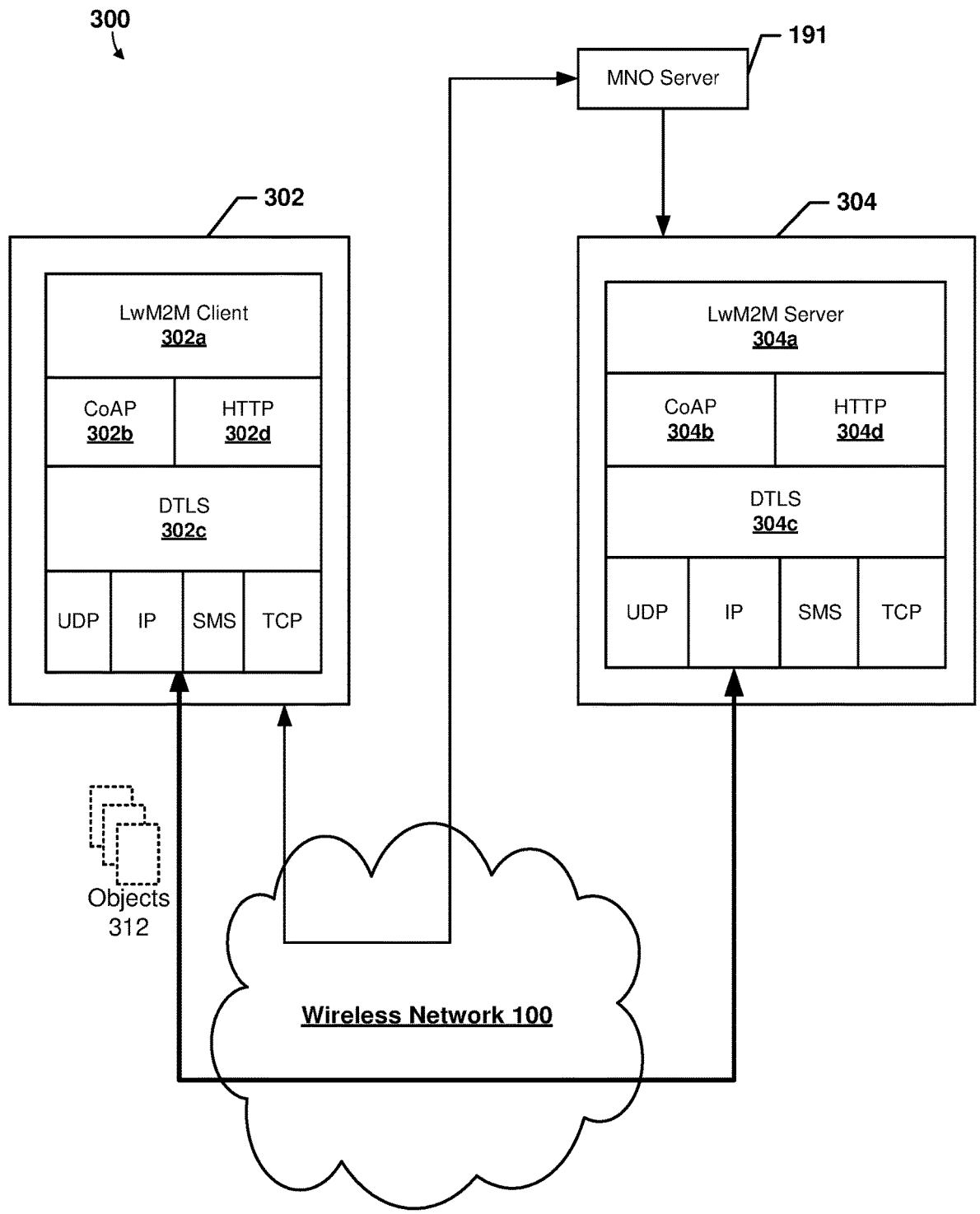
FIG. 3A is a block diagram illustrating an example Lightweight Machine-to-Machine (LwM2M) architecture suitable for implementing various embodiments.

FIG. 3A illustrates an example data call architecture 300 suitable for use with various embodiments. With reference to FIGS. 1-3A, the architecture 300 shows an example of a data call between an IoT device 302 (e.g., wireless device 120a-e) and a server 304 (e.g., LwM2M server 190). The IoT device 302 and the server 304 may be configured to communicate using one or more communication protocols, such as the User Datagram Protocol (UDP), Short Message Service (SMS), Internet Protocol (IP) protocols, Non-IP protocols, Transmission Control Protocol (TCP), etc. As an example, the IoT device 302 may be an LwM2M client computing device. As an example, the server 304 may be an LwM2M server. While illustrated as in communication with one server 304, traffic from the IoT device 302 may be routed to multiple servers each identified by their own respective destination port by the wireless network 100.

In some embodiments, the IoT device 302 may be configured with an LwM2M client 302a that uses the LwM2M device management protocol. The LwM2M device management protocol defines an extensible resource and data model. The LwM2M client 302a may employ a service-layer transfer protocol such as CoAP 302b and/or HTTP 302d to enable, among other things secure data transfer. The IoT device 302 may employ a communication security protocol such as DTLS 302c. DTLS in particular may provide security for datagram-based applications. Such applications may include one or more of UDP applications, SMS applications, Non-IP applications, IP applications, TCP applications, etc. The various applications may structure communications for transmitting data from and/or receiving data at the IoT device 302 via the wireless network 100.

In some embodiments, the server 304 may be configured with an LwM2M server 304a, a transfer protocol such as CoAP 304b and/or HTTP 304d, and a security protocol such as DTLS 304c. The application server 304 may be configured to utilize a variety of communication protocols, such as UDP, SMS, TCP, IP protocol, non-IP protocol and the like.

In various embodiments, the LwM2M client 302a and LwM2M server 304a and may exchange objects 312 with one another via the wireless network 100 according to an LwM2M protocol, such as the LwM2M protocol defined according to the OMA LwM2M specification. In some embodiments, one type of LwM2M object 312 exchanged may be a remote SIM provisioning object. For example, the LwM2M client 302a may generate and send a remote SIM provisioning object to the LwM2M server 304a via the wireless network 100 and the LwM2M server 304a may receive that remote SIM provisioning object from the LwM2M client 302a via the wireless network 100. As another example, the LwM2M server 304a may generate and send a remote SIM provisioning object to the LwM2M client 302a via the wireless network 100 and the LwM2M client 302a may receive that remote SIM provisioning object from the LwM2M server 304a via the wireless network 100.

In various embodiments, the MNO server 191 may send an indication of a SIM profile update for the IoT device 302 to the LwM2M server 304a. The indication of the SIM profile update for the IoT device 302 may be sent directly from the MNO server 191 to the server 304. In this manner, the MNO server 191 may avoid communicating with a SM-DP+ server as required in the RSP Technical Specification and indicate a SIM profile update is to occur for the IoT device 302 directly to the LwM2M server 304a.

In some embodiments, the indication of the SIM profile update for the IoT device 302 from the MNO server 191 may include one or more addresses at which a SIM profile package from the MNO server 191 is available for download by the LwM2M client 302a. As examples, the addresses may be one or more URIs, one or more URLs, etc. In this manner, the addresses may act as pointers to devices from which the LwM2M client 302a may download a SIM profile package. The addresses may be addresses associated with the MNO server 191 itself and/or address associated with servers other than the MNO server 191, such as a SIM profile package server. The one or more addresses may enable a LwM2M client 302*a* to pull a SIM profile package from the MNO server 191 and/or another server, such as a SIM profile package server.

In some embodiments, the MNO server 191 may send a SIM profile package to the LwM2M server 304*a*. The SIM profile package may be sent in addition to including one or more addresses at which the SIM profile package from the MNO server 191 is available for download by the IoT device 302 in the indication of the SIM profile update for the IoT device 302 sent from the MNO server 191 to the LwM2M server 304*a*. Alternatively, the SIM profile package may be sent in place of including one or more addresses at which the SIM profile package from the MNO server 191 is available for download by the IoT device 302 in the indication of the SIM profile update for the IoT device 302 sent from the MNO server 191 to the LwM2M server 304*a*. The provisioning of the SIM profile package by the MNO server 191 to the LwM2M server 304*a* may enable the LwM2M server 304*a* to push the SIM profile package to a LwM2M client 302*a* by sending the SIM profile package to the LwM2M client 302*a* in one or more remote SIM provisioning objects.

FIG. 3B is an example of a remote SIM provisioning object 351 in accordance with various embodiments. With reference to FIGS. 1-3B, the remote SIM provisioning object 351 may be an example of an object 312 exchanged between a LwM2M client computing device (e.g., 120*a-e*, 200, 302) and a LwM2M server (e.g., 190, 304, etc.). While illustrated and discussed with reference to specific IEs 353-377 in FIG. 3B, the IEs 353-377 are merely examples of IEs that may be present in the remote SIM provisioning object 351 and more or less IEs in various different combinations may be present in a remote SIM provisioning object according to various embodiments. For example, the IEs present in a remote SIM provisioning object may vary based on whether the remote SIM provisioning object was generated and/or sent by a LwM2M client computing device or generated and/or sent by a LwM2M server.

In some embodiments, the remote SIM provisioning object 351 may have an object ID assigned to distinguish the remote SIM provisioning object 351 from other type LwM2M objects. In some embodiments, the remote SIM provisioning object 351 may include an object uniform resource name (URN) 352 that may be a URI identifying the remote SIM provisioning object 351. As a specific example, the URN may be "urn:oma:lwm2m:ext:xxxx". In some scenarios, there may be multiple instances of the object URN and the object URN may be optional.

In some embodiments, the remote SIM provisioning object 351 may include a current SIM type IE 353. In some scenarios, the current SIM type IE 353 may be associated with read operations. In some scenarios, there may be a single instance of the current SIM type IE 353 which may be a mandatory IE. In some scenarios, the current SIM type IE 353 may be an integer type IE providing information about the current SIM type of a LwM2M client computing device. As a specific example, the value "0" may indicate a full size SIM, the value "1" may indicate a mini size SIM, the value "2" may indicate a micro SIM, the value "3" may indicate a nano SIM, the value "4" may indicate a USIM, the value "5" may indicate an eSIM, the value "6" may indicate a UICC, the value "7" may indicate a soft SIM, the value "8" may indicate a thin SIM, the value "9" may indicate a eUICC, the value "10" may indicate an iSIM, and the value "11" may indicate an iUICC.

In some embodiments, the remote SIM provisioning object 351 may include a supported SIM type IE 354. In some scenarios, the supported SIM type IE 354 may be associated with read operations. In some scenarios, there may be a single instance of the supported SIM type IE 354 which may be a mandatory IE. In some scenarios, the supported SIM type IE 354 may be an integer type IE providing information about the currently supported SIM types of a LwM2M client computing device. As a specific example, the value "0" may indicate a full size SIM, the value "1" may indicate a mini size SIM, the value "2" may indicate a micro SIM, the value "3" may indicate a nano SIM, the value "4" may indicate a USIM, the value "5" may indicate an eSIM, the value "6" may indicate a UICC, the value "7" may indicate a soft SIM, the value "8" may indicate a thin SIM, the value "9" may indicate an eUICC, the value "10" may indicate an iSIM, and the value "11" may indicate an iUICC.

In some embodiments, the remote SIM provisioning object 351 may include a service provider name 356. In some scenarios, the service provider name 356 may be associated with read operations. In some scenarios, there may be a single instance of the service provider name 356 which may be a mandatory IE. In some scenarios, the service provider name 356 may be a string providing the service provider name that a LwM2M client computing device is currently using to communicate to a LwM2M server.

In some embodiments, the remote SIM provisioning object 351 may include a profile package IE 357. In some scenarios, the profile package IE 357 may be associated with write operations. In some scenarios, there may be a single instance of the profile package IE 357 which may be a mandatory IE. In some embodiments, the profile package IE 357 may carry data of a SIM profile package being pushed from a LwM2M server to a LwM2M client computing device.

In some embodiments, the remote SIM provisioning object 351 may include a profile URI 358. In some scenarios, the profile URI 358 may be associated with read and/or write operations. In some scenarios, there may be a single instance of the profile URI 358 which may be a mandatory IE. In some scenarios, the profile URI 358 may be a string, such as a string of a size of 0-255 bytes. In some scenarios, the profile URI 358 may be a URI from which the LwM2M client computing device may download the profile package. As soon the LwM2M client computing device has received the Profile package URI, the LwM2M client computing device may perform the download at the next practical opportunity. The URI format may be as defined in Internet Engineering Task Force (IETF) Request for Comments (RFC) 3986. For example, coaps://example.org/profile may be a syntactically valid URI. The URI scheme may control the protocol to be used. For example, for CoAP this endpoint may or may not be a LwM2M server. A CoAP server implementing block-wise transfer may be sufficient as a server hosting a firmware repository and such a server may merely serve as a separate file server making profile images available to LwM2M client computing devices. This server can be the future carrier server as well from which the IoT device will receive service after the SIM profile update.

In some embodiments, the remote SIM provisioning object 351 may include a profile update IE 359. In some scenarios, the profile update IE 359 may be associated with execute operations. In some scenarios, there may be a single instance of the profile update IE 359 which may be an optional IE. In some scenarios, the profile update IE 359 may be a profile update trigger indication, such as an executable code or code fragment that may be executable by a LwM2M client computing device to update a SIM profile using a previously successfully downloaded SIM profile package. In some scenarios, the profile update IE 359 may update a SIM profile by using a SIM profile package stored in the profile package IE 357, or, by using the SIM profile package downloaded from an address (e.g., a URI) of the profile URI IE 358. The profile update IE 359 may only be executable when the value of the state IE 360 may be "downloaded."

In some embodiments, the remote SIM provisioning object 351 may include a state IE 360. In some scenarios, the state IE 360 may be associated with read operations. In some scenarios, there may be a single instance of the state IE 360 which may be a mandatory IE. In some scenarios, the state IE 360 may indicate a current state with respect to a SIM profile update for a LwM2M client computing device. The state IE 360 value may be set by the LwM2M client computing device. For example, the value "0" may indicate "Idle" (e.g., before downloading or after successful updating), the value "1" may indicate "Downloading" (e.g., indicating the data sequence is being downloaded), the value "2" may indicate "Downloaded", and the value "3" may indicate "Updating." If writing the profile package to a package resource is complete, or, if the LwM2M client computing device has downloaded the SIM profile package the state changes to Downloaded. Writing an empty string to the package profile URI IE 358 or setting the profile package IE 357 to NULL (e.g., '\0'), may result in a LwM2M client computing device resetting its profile update state machine such that the state IE 360 value is set to Idle and the update result IE 361 value is set to 0. When in the Downloaded state, and the executable profile update IE 359 may be triggered, and the state IE 360 changes to Updating. If the Update Resource failed, the state IE 360 returns at Downloaded. If performing the Update Resource was successful, the state IE 360 changes from Updating to Idle.

In some embodiments, the remote SIM provisioning object 351 may include an update result IE 361. In some scenarios, the update result IE 361 may be associated with read operations. In some scenarios, there may be a single instance of the update result IE 361 which may be a mandatory IE. An update result IE 361 may be an indication of the result of attempting download of a SIM profile package and/or the result of an attempted update of a SIM profile using a downloaded SIM profile package. As specific examples, the value "0" of the update result IE 361 may be an initial value and/or a value used upon initiating updating after downloading, the value "1" of the update result IE 361 may indicate a profile was updated successfully, the value "2" of the update result IE 361 may indicate not enough SIM memory was available for the new SIM profile package, the value "3" of the update result IE 361 may indicate the LwM2M client computing device ran out of RAM during the download process, the value "4" of the update result IE 361 may indicate a connection was lost during the download process, the value "5" of the update result IE 361 may indicate an integrity check for a SIM profile package failed, the value "6" of the update result IE 361 may indicate a SIM profile package was of an unsupported package type, the value "7" of the update result IE 361 may indicate an address, such as a URI, associated with a SIM profile package was invalid, the value "8" of the update result IE 361 may indicate a SIM profile update protocol used was not supported, and the value "9" of the update result IE 361 may indicate a failure to retrieve a SIM profile package from an address (e.g., a URI).

In some embodiments, the remote SIM provisioning object 351 may include a profile name IE 362. In some scenarios, the profile name IE 362 may be associated with read operations. In some scenarios, there may be a single instance of the profile name IE 362 which may be an optional IE. In some scenarios, the profile name IE 362 may be a string, such as a string of a size of 0-255 bytes, representing the name of the SIM profile package.

In some embodiments, the remote SIM provisioning object 351 may include a profile package version IE 363. In some scenarios, the profile package version IE 363 may be associated with read operations. In some scenarios, there may be a single instance of the profile package version IE 363 which may be an optional IE. In some scenarios, the profile package version IE 363 may be a string, such as a string of a size of 0-255 bytes, representing the version number of the SIM profile package.

In some embodiments, the remote SIM provisioning object 351 may include a profile update protocol support IE 364. In some scenarios, the profile update protocol support IE 364 may be associated with read operations. In some scenarios, there may be multiple instances of the profile update protocol support IE 364 which may be an optional IE. In some scenarios, the profile update protocol support IE 364 may be an integer and the value of the profile update protocol support IE 364 the protocols the LwM2M client implements to retrieve SIM profile packages. Specific examples of SIM profile update protocols that may be indicated by the profile update protocol support IE 364 may include the value of "0" indicating CoAP with the additional support for block-wise transfer, the value of "1" indicating CoAPs with the additional support for block-wise transfer, the value of "2" indicating HTTP 1.1, and the value of "3" indicating HTTPS 1.1. Any value not understood by the LwM2M server may be ignored.

In some embodiments, the remote SIM provisioning object 351 may include a profile update delivery method IE 365. In some scenarios, the profile update delivery method IE 365 may be associated with read operations. In some scenarios, there may be a single instance of the profile update delivery method IE 365 which may be a mandatory IE. In some scenarios, the profile update delivery method IE 365 may be an integer value the LwM2M client computing device uses to indicate support for transferring SIM profile images via push delivery methods (e.g., using the profile package IE 356) and/or pull delivery methods (e.g., using the profile URI IE 357).

In some embodiments, the remote SIM provisioning object 351 may include a free memory on SIM IE 366. In some scenarios, the free memory on SIM IE 366 may be associated with read operations. In some scenarios, there may be a single instance of the free memory on SIM IE 366 which may be an optional IE. In some scenarios, the free memory on SIM IE 366 may be an integer value in units of kilo-bytes indicating an estimated current available amount of storage space on a SIM which may store data for the LwM2M client computing device.

In some embodiments, the remote SIM provisioning object 351 may include a total memory on SIM IE 367. In some scenarios, the total memory on SIM IE 367 may be associated with read operations. In some scenarios, there may be a single instance of the total memory on SIM IE 367 which may be an optional IE. In some scenarios, the total memory on SIM IE 367 may be an integer value in units of kilo-bytes indicating a total amount of storage space on a SIM which may store data for the LwM2M client computing device.

In some embodiments, the remote SIM provisioning object 351 may include a supported LTE band information IE 368. In some scenarios, the supported LTE band information IE 368 may be associated with read operations. In some scenarios, there may be a single instance of the supported LTE band information IE 368 which may be an optional IE. In some scenarios, the supported LTE band information IE 368 may be a list of supported LTE bands.

In some embodiments, the remote SIM provisioning object 351 may include a supported EGPRS band information IE 369. In some scenarios, the supported EGPRS band information IE 369 may be associated with read operations. In some scenarios, there may be a single instance of the supported EGPRS band information IE 369 which may be an optional IE. In some scenarios, the supported EGPRS band information IE 369 may be a list of supported EGPRS bands.

In some embodiments, the remote SIM provisioning object 351 may include a supported TD-SCDMA band information IE 370. In some scenarios, the supported TD-SCDMA band information IE 370 may be associated with read operations. In some scenarios, there may be a single instance of the supported TD-SCDMA band information IE 370 which may be an optional IE. In some scenarios, the supported TD-SCDMA band information IE 370 may be a list of supported TD-SCDMA bands.

In some embodiments, the remote SIM provisioning object 351 may include a supported WCDMA band information IE 355. In some scenarios, the supported WCDMA band information IE 355 may be associated with read operations. In some scenarios, there may be a single instance of the supported WCDMA band information IE 355 which may be an optional IE. In some scenarios, the supported WCDMA band information IE 355 may be a list of supported WCDMA bands.

In some embodiments, the remote SIM provisioning object 351 may include a supported CDMA-2000 band information IE 371. In some scenarios, the supported CDMA-2000 band information IE 371 may be associated with read operations. In some scenarios, there may be a single instance of the supported CDMA-2000 band information IE 371 which may be an optional IE. In some scenarios, the supported CDMA-2000 band information IE 371 may be a list of supported CDMA-2000 bands.

In some embodiments, the remote SIM provisioning object 351 may include a supported WiMAX band information IE 372. In some scenarios, the supported WiMAX band information IE 372 may be associated with read operations. In some scenarios, there may be a single instance of the supported WiMAX band information IE 372 which may be an optional IE. In some scenarios, the supported WiMAX band information IE 372 may be a list of supported WiMax bands.

In some embodiments, the remote SIM provisioning object 351 may include a supported NB-IoT band information IE 373. In some scenarios, the supported NB-IoT band information IE 373 may be associated with read operations. In some scenarios, there may be a single instance of the supported NB-IoT band information IE 373 which may be an optional IE. In some scenarios, the supported NB-IoT band information IE 373 may be a list of supported NB-IoT bands.

In some embodiments, the remote SIM provisioning object 351 may include a supported 5G band information IE 374. In some scenarios, the supported 5G band information IE 374 may be associated with read operations. In some scenarios, there may be a single instance of the supported 5G band information IE 374 which may be an optional IE. In some scenarios, the supported 5G band information IE 374 may be a list of supported 5G bands.

In some embodiments, the remote SIM provisioning object 351 may include an ICCID IE 375. In some scenarios, the ICCD IE 375 may be associated with read operations. In some scenarios, there may be a single instance of the ICCD IE 375 which may be an optional IE. In some scenarios, the ICCD IE 375 may be a unique identification number for the UICC and/or smart cards of the LwM2M client computing device.

In some embodiments, the remote SIM provisioning object 351 may include an eUICC ID IE 376. In some scenarios, the eUICC ID IE 376 may be associated with read operations. In some scenarios, there may be a single instance of the eUICC ID IE 376 which may be an optional IE. In some scenarios, the eUICC ID IE 376 may be the registered identifier of the eUICC of the LwM2M client computing device.

In some embodiments, the remote SIM provisioning object 351 may include a profile type IE 377. In some scenarios, the profile type IE 377 may be associated with read operations. In some scenarios, there may be a single instance of the profile type IE 377 which may be an optional IE. In some scenarios, the profile type IE 377 may indicate a type of a SIM profile and may be MNO defined.

In some embodiments, resources of a remote SIM provisioning objects, such as remote SIM provisioning object 351, may be organized into a single object or multiple objects. While FIG. 3B illustrates the remote SIM provisioning object 351 as a single object organized with a series of IEs 353-377, the IEs 353-377 may be distributed over multiple objects, such as multiple SIM provisioning objects 351.

Figure 3C:
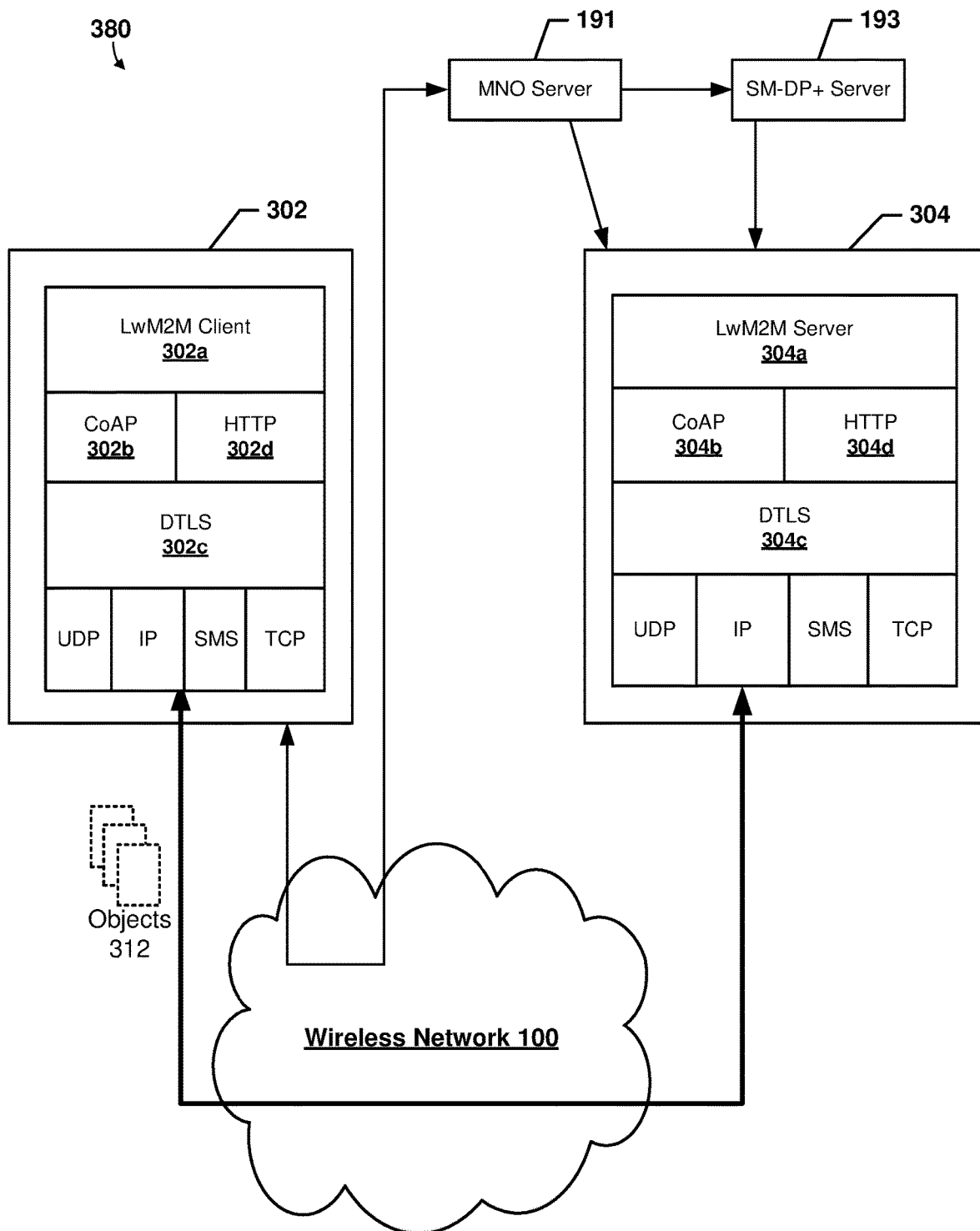
FIG. 3C is a block diagram illustrating an example LwM2M architecture suitable for implementing some embodiments.

FIG. 3C illustrates an example data call architecture 380 suitable for use with some embodiments. With reference to FIGS. 1-3C the architecture 380 shows an example of a data call between an IoT device 302 (e.g., wireless device 120a-e) and a server 304 (e.g., LwM2M server 190). The architecture 380 is similar to the architecture 300 described with reference to FIG. 3A, except that the SM-DP+ server 193 may provide the SIM profile package to the server 304.

In some embodiments, the MNO server 191 may send an indication of a SIM profile update for the IoT device 302 to the LwM2M server 304a and/or the SM-DP+ server 193. In some embodiments, the SM-DP+ server may forward the indication of the SIM profile update for the IoT device 302 received from the MNO server 191 to the server 304.

In some embodiments, the indication of the SIM profile update for the IoT device 302 forwarded by the SM-DP+ server 193 may include one or more addresses at which a SIM profile package from the SM-DP+ server 193 is available for download by the LwM2M server 304a. As examples, the addresses may be one or more URIs, one or more URLs, and the like. The addresses may be addresses associated with the SM-DP+ server 193 itself and/or addresses associated with servers other than the SM-DP+ server 193, such as a SIM profile package server. The one or more addresses may enable an LwM2M server 304a to pull a SIM profile package from the SM-DP+ server 193 and/or another server, such as a SIM profile package server.

In some embodiments, the SM-DP+ server 193 may send a SIM profile package to the LwM2M server 304a. The SIM profile package may be sent in addition to the indication of the SIM profile update for the IoT device 302 sent from the MNO server 191 to the SM-DP+ server 193 and/or the LwM2M server 304a that includes one or more addresses at which the SIM profile package from the SM-DP+ server 193 is available for download. Alternatively, the SIM profile package may be sent in place of including one or more addresses at which the SIM profile package from the SM-DP+ server 193 is available for download in the indication of the SIM profile update for the IoT device 302 sent from the MNO server 191 to the SM-DP+ server 193 and/or the LwM2M server 304*a*. Provisioning of the SIM profile package by the SM-DP+ server 193 to the LwM2M server 304*a* may enable the LwM2M server 304*a* to push the SIM profile package to an LwM2M client 302*a* by sending the SIM profile package to the LwM2M client 302*a* in one or more remote SIM provisioning objects (e.g., remote SIM provisioning object 351). Provisioning of the SIM profile package by the SM-DP+ server 193 to the LwM2M server 304*a* followed by the LwM2M server 304*a* pushing the SIM profile package to the LwM2M client 302*a* in one or more remote SIM provisioning objects may ensure secure connections (e.g., DTLS connections, TLS connections, etc.) can be used for provisioning the SIM profile package to the LwM2M client 302*a*. As an example, the LwM2M client 302*a* need not use unsecure connections to reach the SM-DP+ server 193 to download the SIM profile package directly, as the SIM profile package may be provided to the LwM2M client 302*a* by the LwM2M server 304*a*. Additionally, provisioning of the SIM profile package by the SM-DP+ server 193 to the LwM2M server 304*a* followed by the LwM2M server 304*a* pushing the SIM profile package to the LwM2M client 302*a* in one or more remote SIM provisioning objects may enable an LwM2M client 302*a* to receive a SIM profile package from the SM-DP+ server 193 without needing to implement a client side SM-DP+ protocol at the IoT device 302 because the IoT device 302 may not need to communicate directly with the SM-DP+ server 193.

Figure 3D:
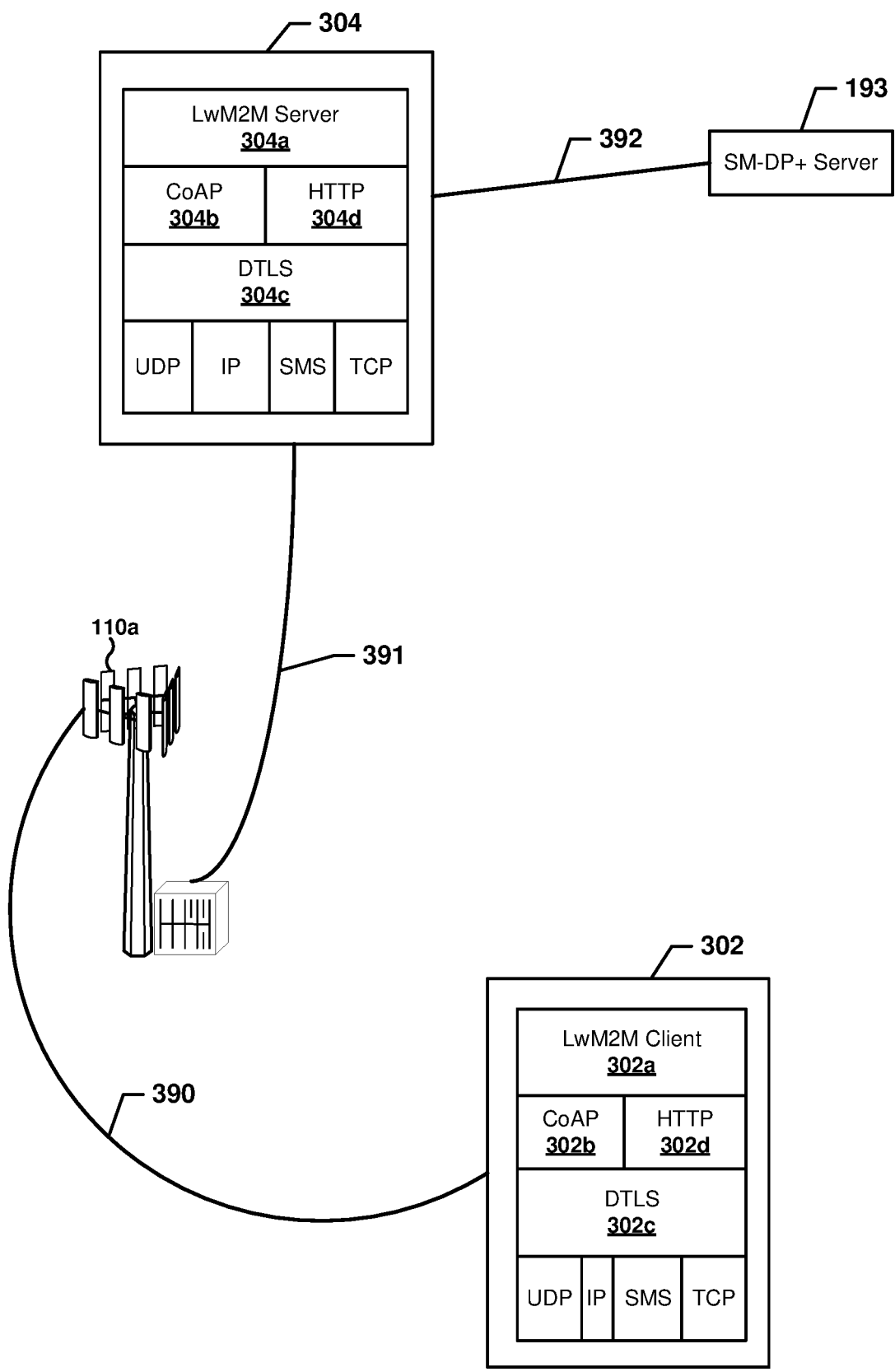
FIG. 3D is a block diagram illustrating connections in an example LwM2M architecture suitable for implementing some embodiments.

FIG. 3D illustrates an example connection topology in the data call architecture 380 suitable for use with some embodiments. With reference to FIGS. 1-3D, the connection between the LwM2M server 304*a* and LwM2M client 302*a* may be a wireless and/or wired backhaul connection representing a secured link 390 between the IoT device 302 and the serving base station 110*a*, as well as a secured link 391 between the serving base station 110*a* and the server 304. Additionally, a secured link 392 (established via wired and/or wireless connections) may be established between the SM-DP+ server 193 and the server 304. In some embodiments, the IoT device 302 may use secured links (e.g., 390, 391, 392) to communicate with the server 304 and/or the SM-DP+ server 193. In some embodiments, the LwM2M client 302*a* may communicate with the LwM2M server 304*a* initially and then communicate with the SM-DP+ server 193 to receive a SIM profile package from the SM-DP+ server 193. In some embodiments, the SM-DP+ server 193 may distribute a SIM profile package to the LwM2M server 304*a* and the LwM2M server 304*a* may send the SIM profile package to the LwM2M client 302*a*.

Figure 4A:
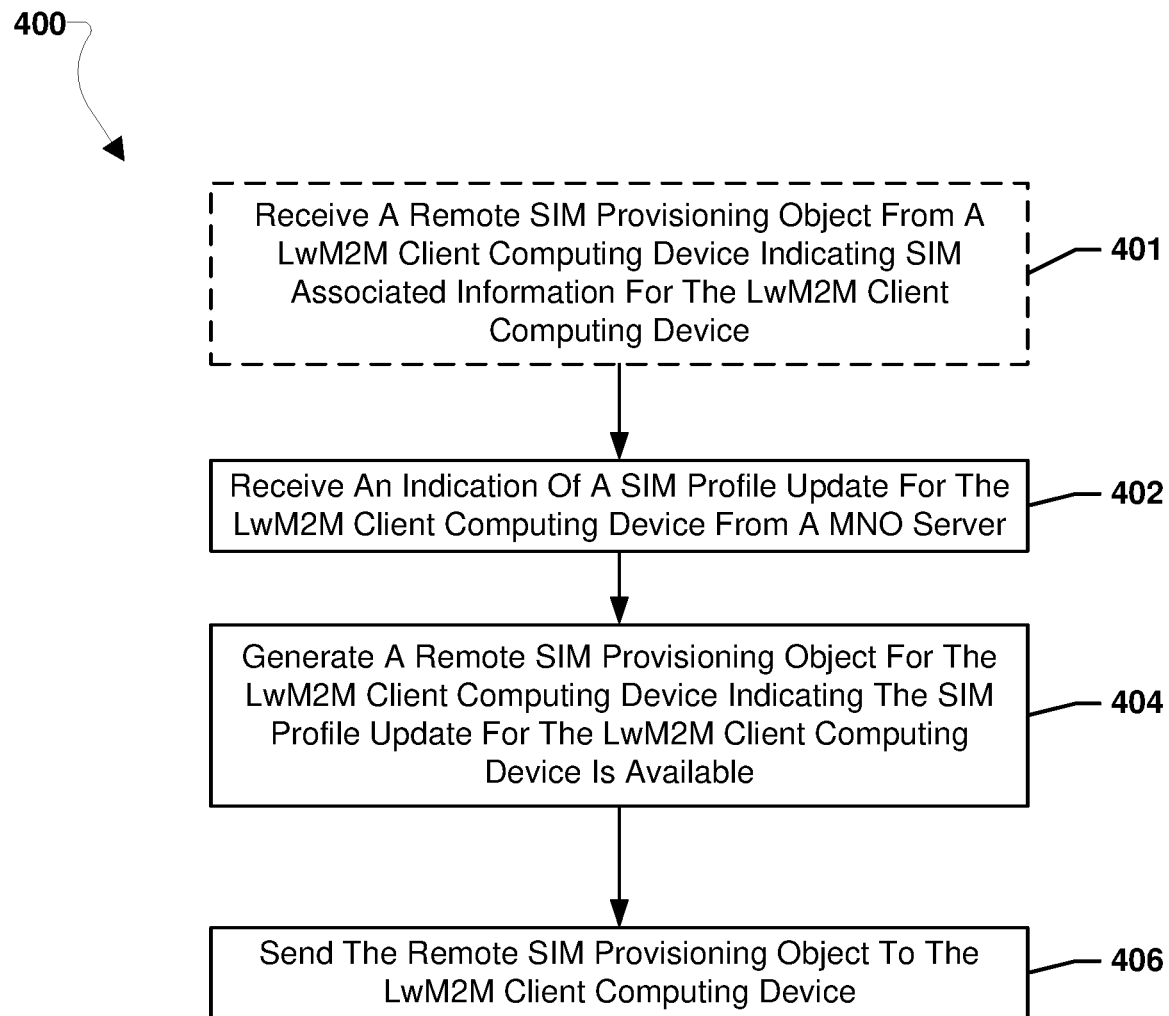
FIG. 4A is a process flow diagram illustrating a method that may be performed by an LwM2M server for supporting remote SIM profile provisioning in accordance with some embodiments.

FIG. 4A is a process flow diagram illustrating a method 400 that may be performed by an LwM2M server for supporting remote SIM profile provisioning in accordance with various embodiments. With reference to FIGS. 1-4A, the method 400 may be implemented in hardware components and/or software components of a network element functioning as an LwM2M server (e.g., 190, 304*a*), the operations of which may be controlled by one or more processors. For ease of reference, the hardware performing the method 400 is referred to generally herein as a "processor."

In optional block 401, the processor may receive a remote SIM provisioning object from a LwM2M client computing device (e.g., 120*a-e*, 200, 302) indicating SIM associated information for the LwM2M client computing device. For example, the remote SIM provisioning object may be a remote SIM provisioning object 312 and/or 351 as described with reference to FIGS. 3A and 3B. As specific examples, the remote SIM provisioning object may include various types of SIM associated information for the LwM2M client computing device alone or in various combinations, such as supported delivery methods (e.g., push and/or pull), supported RF bands, free memory space for a SIM, a SIM profile update protocol supported by the LwM2M client computing device, support SIM types, etc. Block 401 may be optional, as there may not be any required communication between the LwM2M server and a LwM2M client computing device prior to receiving an indication of a SIM profile update for the LwM2M client computing device.

In block 402, the processor may receive an indication of a SIM profile update for the LwM2M client computing device from an MNO server (e.g., MNO server 191). In various embodiments, an MNO server may send an indication of a SIM profile update for a LwM2M client computing device, such as an IoT device, to a LwM2M server. The indication of the SIM profile update for the LwM2M client computing device, such as the IoT device, may be sent directly from the MNO server to the LwM2M server. In this manner, the MNO server may avoid communicating with a SM-DP+ server as required in the RSP Technical Specification and indicate a SIM profile update is to occur for the LwM2M client computing device directly to the LwM2M server.

In some embodiments, the indication of the SIM profile update for the LwM2M client computing device from the MNO server may include one or more addresses at which a SIM profile package from the MNO server is available for download by the LwM2M client computing device. As examples, the addresses may be one or more URIs, one or more URLs, etc. In this manner, the addresses may act as pointers to devices from which the LwM2M client computing device may download a SIM profile package. The addresses may be addresses associated with the MNO server itself and/or address associated with servers other than the MNO server, such as a SIM profile package server. The one or more addresses may enable a LwM2M client device to pull a SIM profile package from the MNO server and/or another server, such as a SIM profile package server.

In block 404, the processor may generate a remote SIM provisioning object for the LwM2M client computing device indicating the SIM profile update for the LwM2M client computing device is available. For example, the remote SIM provisioning object may be a remote SIM provisioning object 312 and/or 351 as described with reference to FIGS. 3A and 3B. In some embodiments, the remote SIM provisioning object may include an indication of one or more addresses at which a SIM profile package from the MNO server is available for download by the LwM2M client computing device.

In block 406, the processor may send the remote SIM provisioning object to the LwM2M client computing device. In some embodiments, sending the remote SIM provisioning object to the LwM2M client computing device may include sending the remote SIM provisioning object to the LwM2M client computing device using a secure connection, such as a DTLS connection, TLS connection, etc.

Figure 4B:
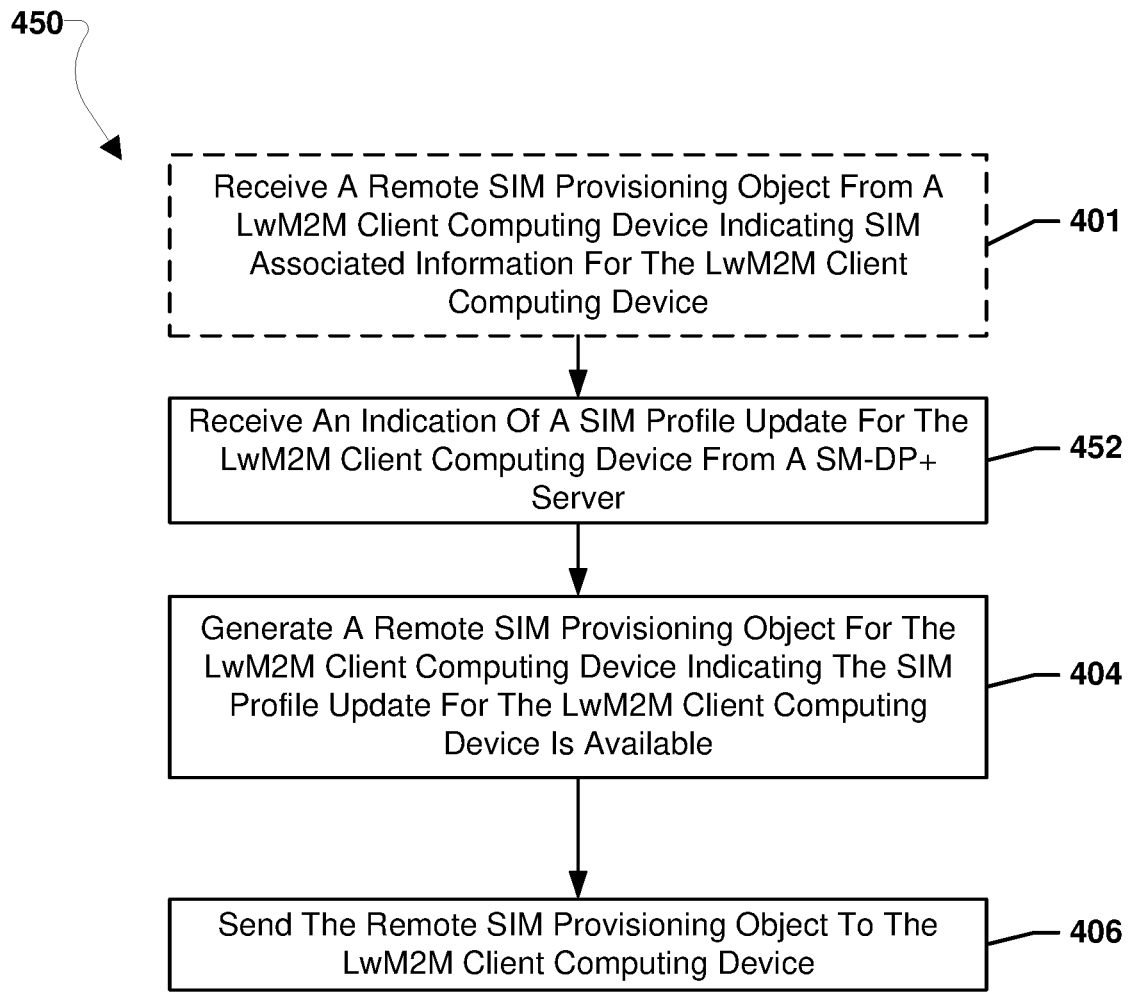
FIG. 4B is a process flow diagram illustrating a method that may be performed by an LwM2M server for supporting remote SIM profile provisioning in accordance with various embodiments.

FIG. 4B is a process flow diagram illustrating a method 450 that may be performed by an LwM2M server for supporting remote SIM profile provisioning in accordance with various embodiments. With reference to FIGS. 1-4B, the method 450 may be implemented in hardware components and/or software components of a network element functioning as an LwM2M server (e.g., 190, 304a), the operations of which may be controlled by one or more processors. For ease of reference, the hardware performing the method 450 is referred to generally herein as a "processor."

In optional block 401, the processor may perform operations of the like numbered block of the method 400 as described.

In block 452, the processor may receive an indication of a SIM profile update for the LwM2M client computing device from an SM-DP+ server (e.g., SM-DP+ server 193). In some embodiments, an SM-DP+ server may send an indication of a SIM profile update for an LwM2M client computing device, such as an IoT device, to a LwM2M server. In some embodiments, the indication of a SIM profile update for an LwM2M client computing device may have been received at the SM-DP+ server originally from an MNO server (e.g., MNO server 191). In some embodiments, an MNO server (e.g., MNO server 191) may have also sent an indication of a SIM profile update for an LwM2M client computing device to the LwM2M server such that the LwM2M server receives an indication of a SIM profile update for an LwM2M client computing device from both the MNO server and an SM-DP+ server (e.g., SM-DP+ server 193).

In some embodiments, the indication of the SIM profile update for the LwM2M client computing device from an SM-DP+ server (e.g., SM-DP+ server 193) may include one or more addresses at which a SIM profile package from the SM-DP+ server is available for download by the LwM2M server. As examples, the addresses may be one or more URIs, one or more URLs, etc. In this manner, the addresses may act as pointers to devices from which the LwM2M server may download a SIM profile package. The addresses may be addresses associated with the SM-DP+ itself and/or addresses associated with servers other than the SM-DP+, such as a SIM profile package server. The one or more addresses may enable the LwM2M server to pull a SIM profile package from the SM-DP+ and/or another server, such as a SIM profile package server, and provide that pulled SIM profile package onto an LwM2M client device (e.g., LwM2M client computing device (e.g., 120a-e, 200, 302, etc.).

In block 404, the processor may perform operations of the like numbered block of the method 400 as described. For example, the remote SIM provisioning object may be a remote SIM provisioning object 312 and/or 351 as described with reference to FIGS. 3A-3C.

In block 406, the processor may perform operations of the like numbered block of method 400 as described.

Figure 5:
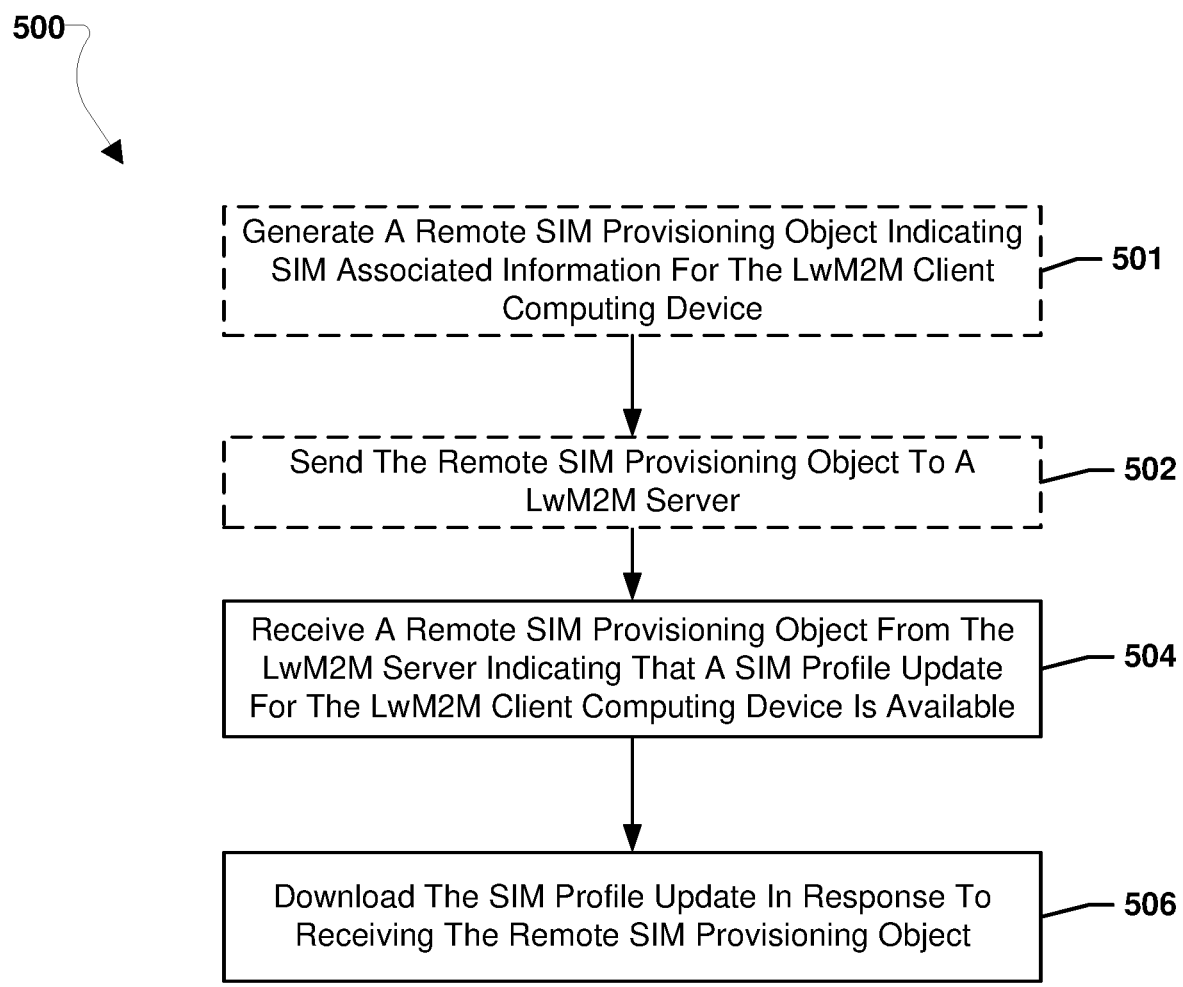
FIG. 5 is a process flow diagram illustrating a method that may be performed by an LwM2M client computing device for supporting remote SIM profile provisioning in accordance with various embodiments.

FIG. 5 is a process flow diagram illustrating a method 500 that may be performed by an LwM2M client computing device for supporting remote SIM profile provisioning in accordance with various embodiments. With reference to FIGS. 1-5, the method 500 may be implemented in hardware components and/or software components of a LwM2M client computing device (e.g., 120a-e, 200, 302, etc.), the operations of which may be controlled by one or more processors (e.g., 212, 216, 252 or 260). For ease of reference, the hardware performing the method 500 is referred to generally herein as a "processor." Operations of the method 500 may be performed by an LwM2M client computing device in conjunction with an LwM2M server (e.g., 190, 304a) performing the operations of methods 400 (FIG. 4A) and/or 450 (FIG. 4B).

In optional block 501, the processor may generate a remote SIM provisioning object indicating SIM associated information for the LwM2M client computing device. For example, the remote SIM provisioning object may be a remote SIM provisioning object 312 and/or 351 as described with reference to FIGS. 3A-3C. As specific examples, the remote SIM provisioning object may include various types of SIM associated information for the LwM2M client computing device alone or in various combinations, such as supported delivery methods (e.g., push and/or pull), supported RF bands, free memory space for a SIM, a SIM profile update protocol supported by the LwM2M client computing device, support SIM types, etc.

In optional block 502, the processor may send the remote SIM provisioning object to a LwM2M server. In some embodiments, sending the remote SIM provisioning object to the LwM2M server may include sending the remote SIM provisioning object to the LwM2M server using a secure connection, such as a DTLS connection, TLS connection, etc.

Blocks 501 and 502 may be optional, as there may not be any required communication between the LwM2M server and a LwM2M client computing device prior to receiving a remote SIM provisioning object from the LwM2M server.

In block 504, the processor may receive a remote SIM provisioning object from the LwM2M server indicating that a SIM profile update for the LwM2M client computing device is available. For example, the remote SIM provisioning object may be a remote SIM provisioning object 312 and/or 351 as described with reference to FIGS. 3A-3C. In some embodiments, the remote SIM provisioning object may include an indication of one or more addresses at which a SIM profile package from the MNO server is available for download by the LwM2M client computing device. In some embodiments, the remote SIM provisioning object may include an indication that a SIM profile package may be received directly from an LwM2M server (e.g., 190, 304a).

In block 506, the processor may download the SIM profile update in response to receiving the remote SIM provisioning object. In some embodiments, downloading the SIM profile update may include receiving a SIM profile package in in one or more additional remote SIM provisioning objects from the LwM2M server and/or receiving the SIM profile package in response to sending a request for the SIM profile package to an address in the received remote SIM provisioning object.

Figure 6A:
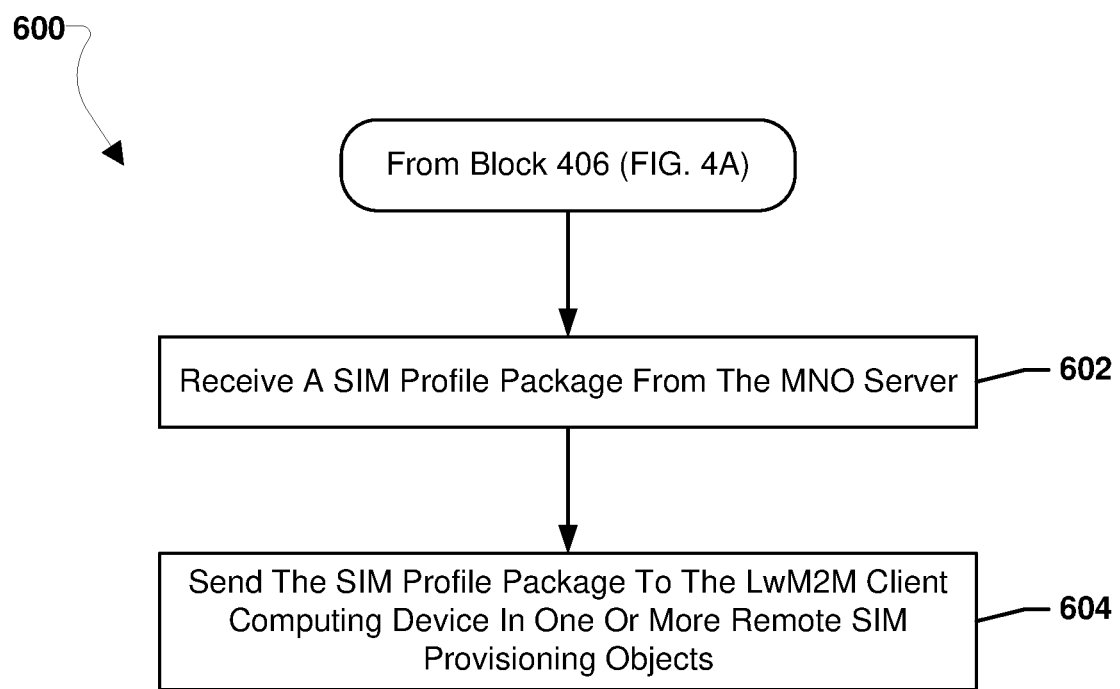
FIG. 6A is a process flow diagram illustrating a method that may be performed by an LwM2M server for supporting remote SIM profile provisioning in accordance with some embodiments.

FIG. 6A is a process flow diagram illustrating a method 600 that may be performed by an LwM2M server for supporting remote SIM profile provisioning in accordance with various embodiments. With reference to FIGS. 1-6A, the method 600 may be implemented in hardware components and/or software components of a network element functioning as an LwM2M server (e.g., 190, 304a), the operations of which may be controlled by one or more processors. For ease of reference, the hardware performing the method 600 is referred to generally herein as a "processor." Operations of the method 600 may be performed by an LwM2M server in conjunction with the operations of method 400 (FIG. 4A). For example, the operations of method 600 may be performed in response to sending the remote SIM provisioning object to the LwM2M client computing device in block 406 of method 400 (FIG. 4).

In block 602, the processor may receive a SIM profile package from the MNO server. In some embodiments, the MNO server may send a SIM profile package to an LwM2M server. The SIM profile package may be sent in addition to including one or more addresses at which the SIM profile package from the MNO server is available for download by the LwM2M client computing device in the indication of the SIM profile update for the LwM2M client computing device sent from the MNO server to the LwM2M server. Alternatively, the SIM profile package may be sent in place of including one or more addresses at which the SIM profile package from the MNO server is available for download by the LwM2M client computing device in the indication of the SIM profile update for the LwM2M client computing device sent from the MNO server to the LwM2M server.

In block 604, the processor may send the SIM profile package to the LwM2M client computing device in one or more remote SIM provisioning objects. For example, the processor may send data of the SIM profile package as part of a profile package element (e.g., profile package IE 357) of one or more remote SIM provisioning objects (e.g., 351). In this manner, the LwM2M server may push the SIM profile package to the LwM2M client computing device.

Figure 6B:
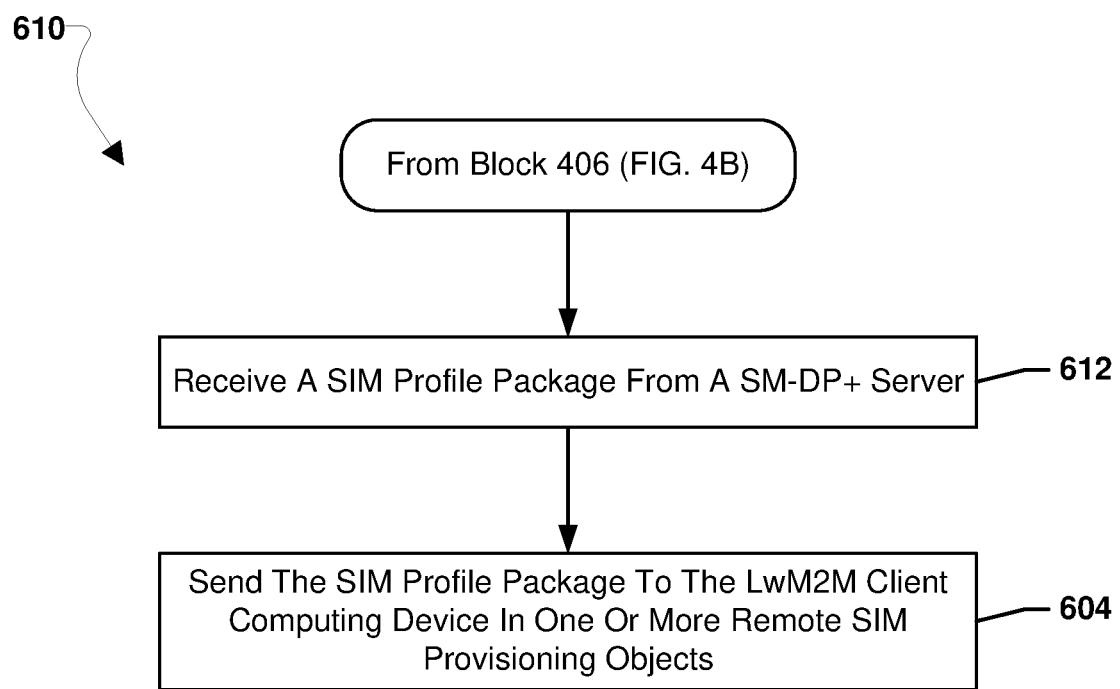
FIG. 6B is a process flow diagram illustrating a method that may be performed by an LwM2M server for supporting remote SIM profile provisioning in accordance with some embodiments.

FIG. 6B is a process flow diagram illustrating a method 610 that may be performed by an LwM2M server for supporting remote SIM profile provisioning in accordance with various embodiments. With reference to FIGS. 1-6B, the method 610 may be implemented in hardware components and/or software components of a network element functioning as an LwM2M server (e.g., 190, 304a), the operations of which may be controlled by one or more processors. For ease of reference, the hardware performing the method 610 is referred to generally herein as a "processor." Operations of the method 610 may be performed by an LwM2M server in conjunction with the operations of the method 450 (FIG. 4B). For example, the operations of the method 610 may be performed in response to sending the remote SIM provisioning object to the LwM2M client computing device in block 406 of method 450 (FIG. 4B).

In block 612, the processor may receive a SIM profile package from an SM-DP+ server (e.g., SM-DP+ server 193, etc.). In some embodiments, the SM-DP+ server may send a SIM profile package to an LwM2M server. The SIM profile package may be sent in addition to including one or more addresses at which the SIM profile package from the SM-DP+ server is available for download by the LwM2M server in the indication of the SIM profile update for the LwM2M client computing device sent from the MNO server and/or SM-DP+ server to the LwM2M server. Alternatively, the SIM profile package may be sent in place of including one or more addresses at which the SIM profile package from the SM-DP+ server is available for download by the LwM2M server in the indication of the SIM profile update for the LwM2M client computing device sent from the SM-DP+ server to the LwM2M server.

In block 604, the processor may perform operations of the like numbered block of the method 600 as described.

Figure 6C:
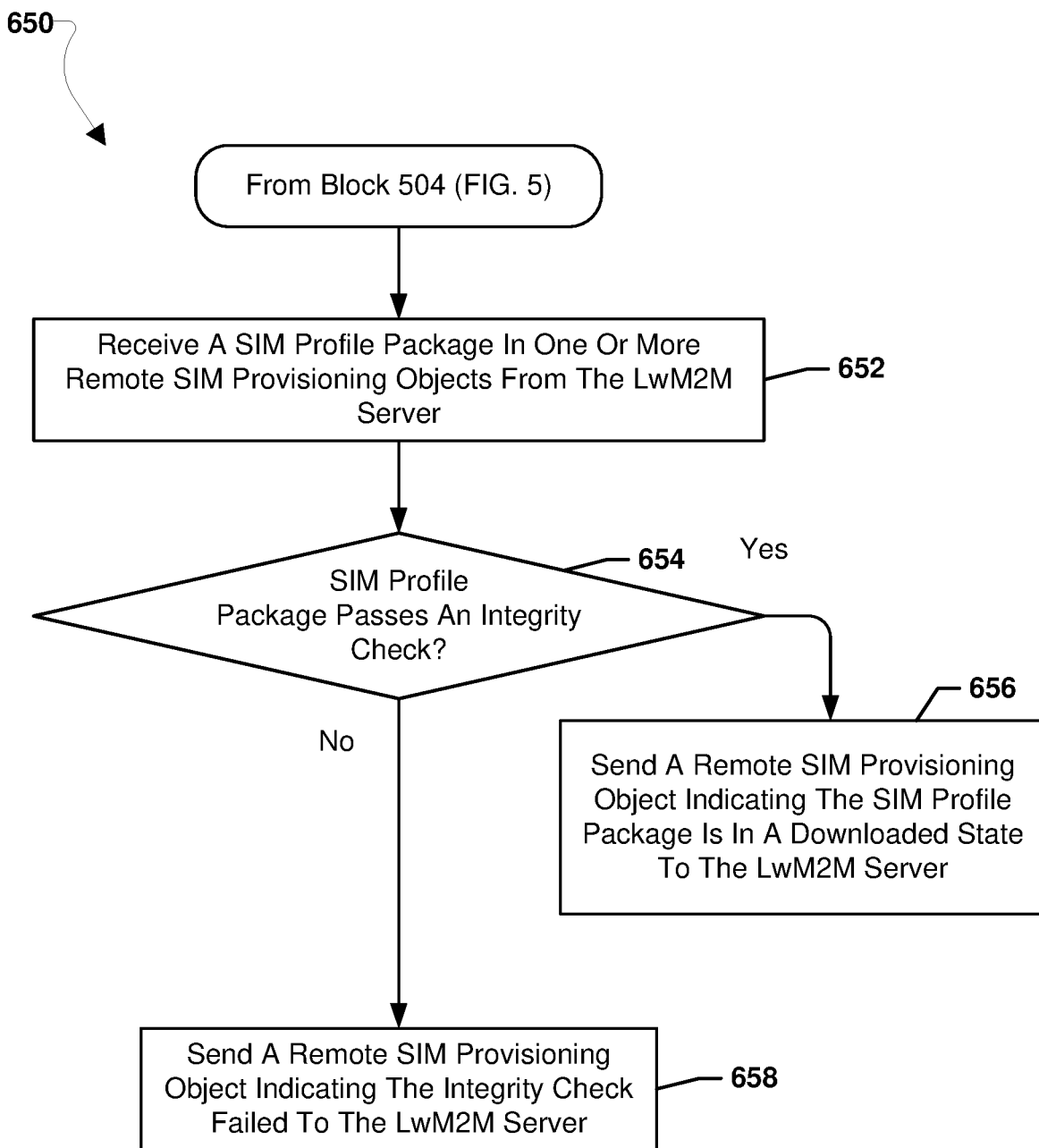
FIG. 6C is a process flow diagram illustrating a method that may be performed by an LwM2M client computing device for downloading a SIM profile update in accordance with some embodiments.

FIG. 6C is a process flow diagram illustrating a method 650 that may be performed by an LwM2M client computing device for downloading a SIM profile update in accordance with some embodiments. With reference to FIGS. 1-6C, the method 650 may be implemented in hardware components and/or software components of a LwM2M client computing device (e.g., 120a-e, 200, 302, etc.), the operations of which may be controlled by one or more processors (e.g., 212, 216, 252 or 260). For ease of reference, the hardware performing the method 650 is referred to generally herein as a "processor." Operations of the method 650 may be performed by an LwM2M client computing device in conjunction with the operations of method 500 (FIG. 5). For example, the operations of method 650 may be performed as part of the operations of block 506 to download the SIM profile update in response to receiving a remote SIM provisioning object from the LwM2M server indicating that a SIM profile update for the LwM2M client computing device is available in block 504 of method 500 (FIG. 5).

In block 652, the processor may receive a SIM profile package in one or more remote SIM provisioning objects from the LwM2M server. For example, the processor may receive data of a SIM profile package as part of a profile package element (e.g., profile package IE 357) of one or more remote SIM provisioning objects (e.g., 351). In this manner, the LwM2M server may push the SIM profile package to the LwM2M client computing device.

In determination block 654, the processor may determine whether the SIM profile package passes an integrity check. For example, the processor may determine whether the DTLS operations for the transport of the SIM profile package validate the received SIM profile package to determine whether the SIM profile package passes an integrity check.

In response to determining that the SIM profile package does not pass the integrity check (i.e., determination block 654="No"), the processor may send a remote SIM provisioning object indicating the integrity check failed to the LwM2M server in block 658. For example, the processor may send a remote SIM provisioning object (e.g., 351) including an indication that the integrity check failed (e.g., update result IE 361="5" corresponding to an integrity check failure).

In response to determining that the SIM profile package passes the integrity check (i.e., determination block 654="Yes"), the processor may send a remote SIM provisioning object indicating the SIM profile package is in a downloaded state in block 656. For example, the processor may send a remote SIM provisioning object (e.g., 351) including an indication that the integrity check downloaded successfully (e.g., update result IE 361="1" corresponding to success) and/or an indication that the state with respect to the SIM profile update is downloaded (e.g., state IE 360="2" corresponding to "Downloaded").

Figure 7A:
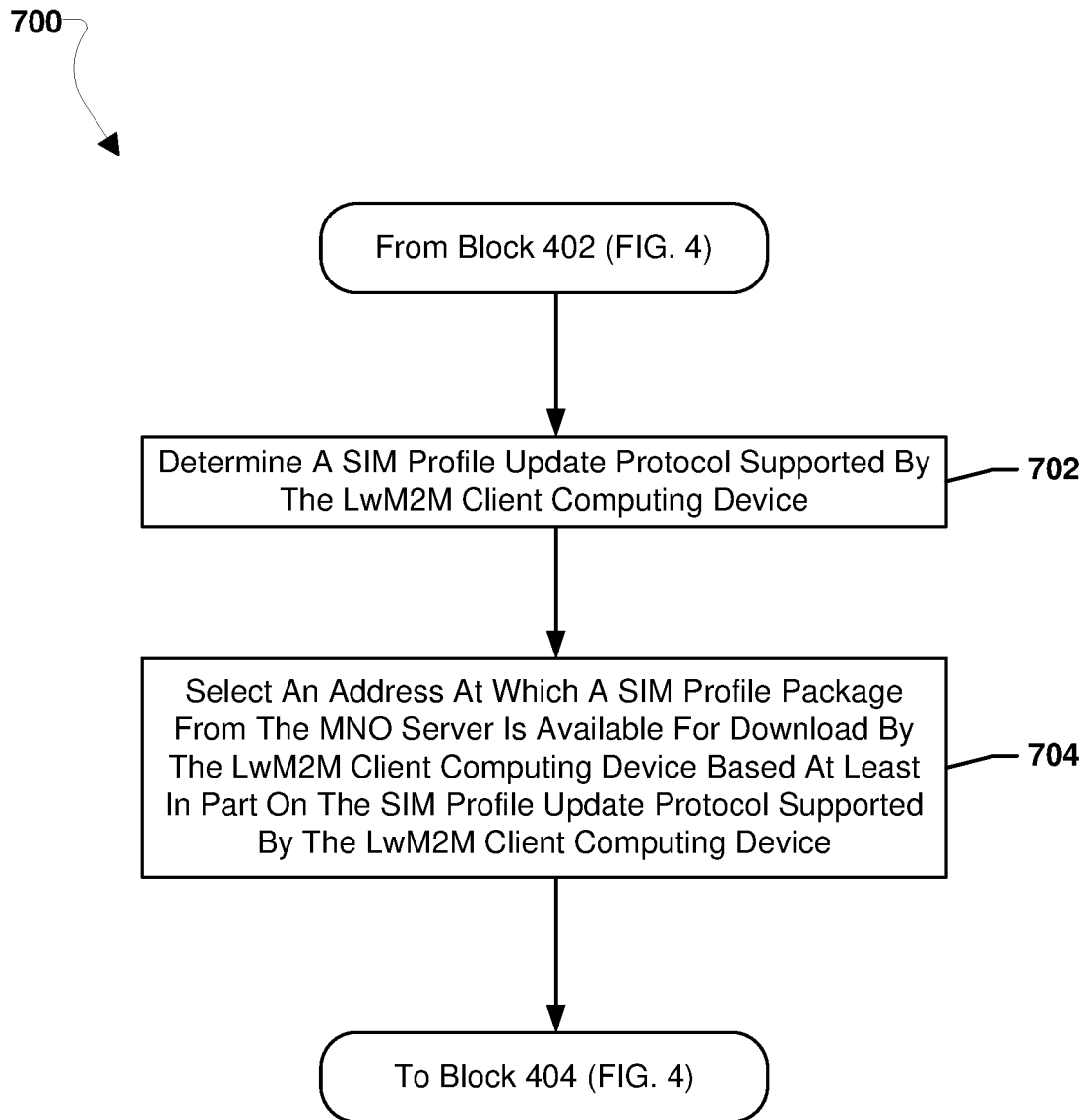
FIG. 7A is a process flow diagram illustrating a method that may be performed by an LwM2M server for supporting remote SIM profile provisioning in accordance with some embodiments.

FIG. 7A is a process flow diagram illustrating a method 700 that may be performed by an LwM2M server for supporting remote SIM profile provisioning in accordance with some embodiments. With reference to FIGS. 1-7A, the method 700 may be implemented in hardware components and/or software components of a network element functioning as an LwM2M server (e.g., 190, 304a), the operations of which may be controlled by one or more processors. For ease of reference, the hardware performing the method 700 is referred to generally herein as a "processor." Operations of the method 700 may be performed by an LwM2M server in conjunction with the operations of method 400 (FIG. 4A). For example, the operations of method 700 may be performed in response to receiving an indication of a SIM profile update in block 402 and prior to generating the remote SIM provisioning object in block 404 of method 400 (FIG. 4A).

In block 702, the processor may determine a SIM profile update protocol supported by the LwM2M client computing device. For example, the LwM2M client computing device may have indicating the SIM profile update protocol supported by the LwM2M client computing device in a remote SIM provisioning object (e.g., 312 and/or 351) and the LwM2M server may determine the SIM profile update protocol supported by the LwM2M client computing device to the be SIM profile update protocol indicated in the remote SIM provisioning object (e.g., the SIM profile update protocol indicated in the profile update protocol support IE 364).

In block 704, the processor may select an address at which a SIM profile package from the MNO server is available for download by the LwM2M client computing device based at least in part on the SIM profile update protocol supported by the LwM2M client computing device. The LwM2M server may select one of the one or more addresses based at least in part on the SIM profile update protocol supported by the LwM2M client computing device. In this manner, the LwM2M server may ensure the address, such as a URI, selected for the LwM2M client computing device is of a format supported by the LwM2M client computing device. As a specific example, in a scenario in which the LwM2M client computing device sends a remote SIM provisioning object to the LwM2M server indicating only CoAP is supported, the LwM2M server may ensure a CoAP URI is selected for sending to the LwM2M client computing device and not a HTTP URI as the LwM2M client computing device may not support HTTP.

Figure 7B:
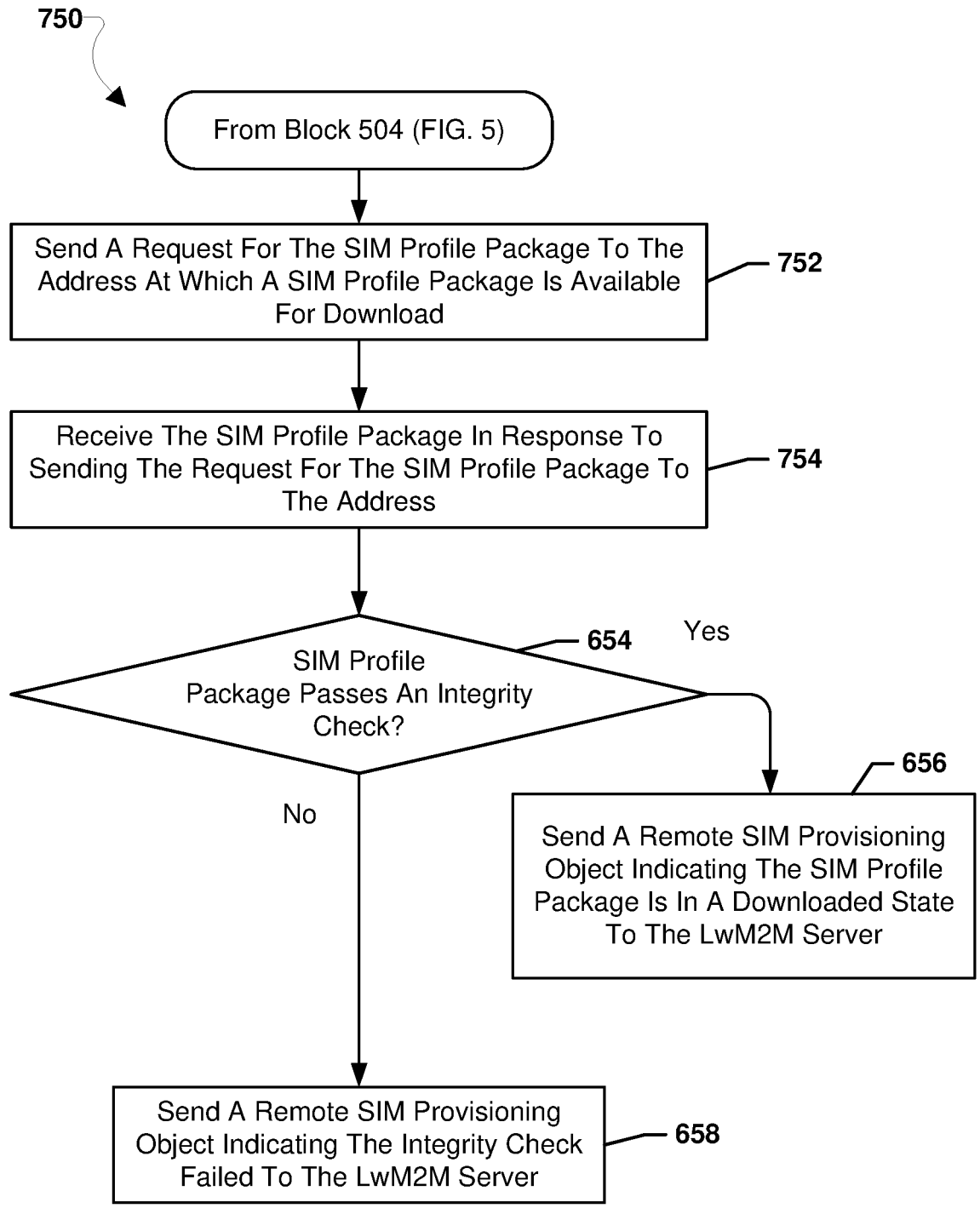
FIG. 7B is a process flow diagram illustrating a method that may be performed by an LwM2M client computing device for downloading a SIM profile update in accordance with some embodiments.

FIG. 7B is a process flow diagram illustrating a method 750 that may be performed by an LwM2M client computing device for downloading a SIM profile update in accordance with some embodiments. With reference to FIGS. 1-7B, the method 750 may be implemented in hardware components and/or software components of a LwM2M client computing device (e.g., 120a-e, 200, 302, etc.), the operations of which may be controlled by one or more processors (e.g., 212, 216, 252 or 260). For ease of reference, the hardware performing the method 750 is referred to generally herein as a "processor." Operations of the method 750 may be performed by an LwM2M client computing device in conjunction with the operations of method 500 (FIG. 5). For example, the operations of method 750 may be performed as part of the operations of block 506 to download the SIM profile update in response to receiving a remote SIM provisioning object from the LwM2M server indicating that a SIM profile update for the LwM2M client computing device is available in block 504 of method 500 (FIG. 5).

In block 752, the processor may send a request for the SIM profile package to the address at which the SIM profile package is available for download. For example, the processor may send a CoAP request (e.g., a coap) or HTTP request (e.g., a GET) to the URI at which the SIM profile package is available for download.

In block 754, the processor may receive the SIM profile package in response to sending the request for the SIM profile package to the address. For example, the SIM profile package may be received in a CoAP response or HTTP response from the server associated with the address at which the SIM profile package is available for download.

In blocks 654, 656, and 658, the processor may perform like operations of like numbered blocks of method 650 as described with reference to FIG. 6C.

Figure 8:
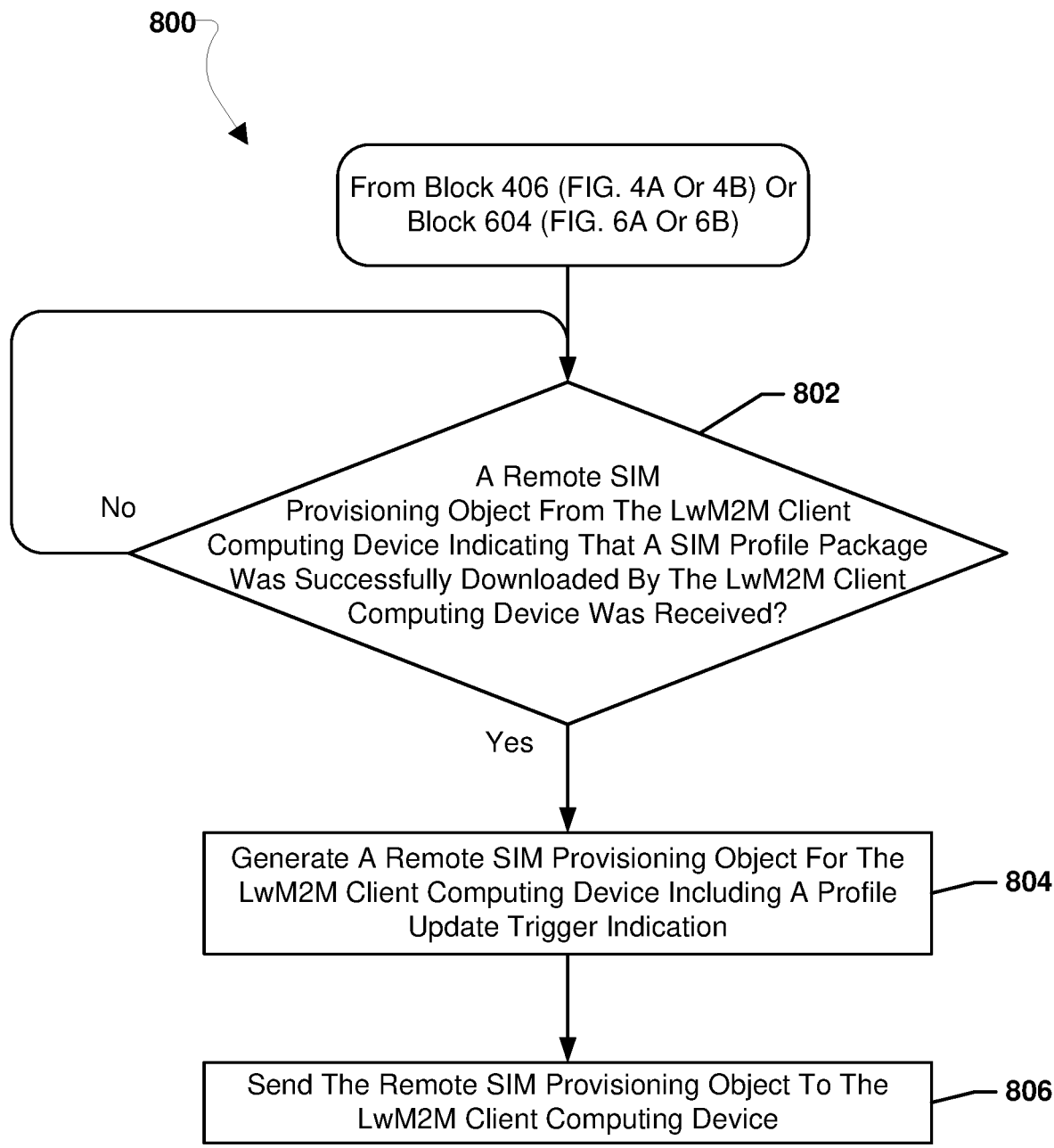
FIG. 8 is a process flow diagram illustrating a method that may be performed by an LwM2M server for supporting remote SIM profile provisioning in accordance with some embodiments.

FIG. 8 is a process flow diagram illustrating a method 800 that may be performed by an LwM2M server for supporting remote SIM profile provisioning in accordance with some embodiments. With reference to FIGS. 1-8, the method 800 may be implemented in hardware components and/or software components of a network element functioning as an LwM2M server (e.g., 190, 304a), the operations of which may be controlled by one or more processors. For ease of reference, the hardware performing the method 800 is referred to generally herein as a "processor." Operations of the method 800 may be performed by an LwM2M server in conjunction with the operations of method 400 (FIG. 4A), 450 (FIG. 4B), 600 (FIG. 6A) and/or 610 (FIG. 6B). For example, the operations of method 800 may be performed in response to sending the remote SIM provisioning object to the LwM2M client computing device in block 406 of method 400 (FIG. 4A) or method 450 (FIG. 4B) or in response to sending the SIM profile package to the LwM2M client computing device in one or more remote SIM provisioning objects in block 604 of method 600 (FIG. 6A) or method 610 (FIG. 6B).

In determination block 802, the processor may determine whether a remote SIM provisioning object from the LwM2M client computing device indicating that a SIM profile package was successfully downloaded by the LwM2M client computing device was received.

In response to determining that a remote SIM provisioning object from the LwM2M client computing device indicating that a SIM profile package was successfully downloaded by the LwM2M client computing device was not received (i.e., determination block 802="No"), the processor may await a remote SIM provisioning object and determine whether a remote SIM provisioning object from the LwM2M client computing device indicating that a SIM profile package was successfully downloaded by the LwM2M client computing device was received in determination block 802.

In response to determining that a remote SIM provisioning object from the LwM2M client computing device indicating that a SIM profile package was successfully downloaded by the LwM2M client computing device was received (i.e., determination block 802="Yes"), the processor may generate a remote SIM provisioning object for the LwM2M client computing device including a profile update trigger indication in block 804. For example, the processor may generate a remote SIM provisioning object (e.g., 351) including a profile update IE (e.g., 359) including an executable code or code fragment that may be executed by the LwM2M client computing device to update a SIM profile using a previously successfully downloaded SIM profile package.

In block 806, the processor may send the remote SIM provisioning object to the LwM2M client computing device. In some embodiments, sending the remote SIM provisioning object to the LwM2M client computing device may include sending the remote SIM provisioning object to the LwM2M client computing device using a secure connection, such as a DTLS connection, TLS connection, etc.

Figure 9:
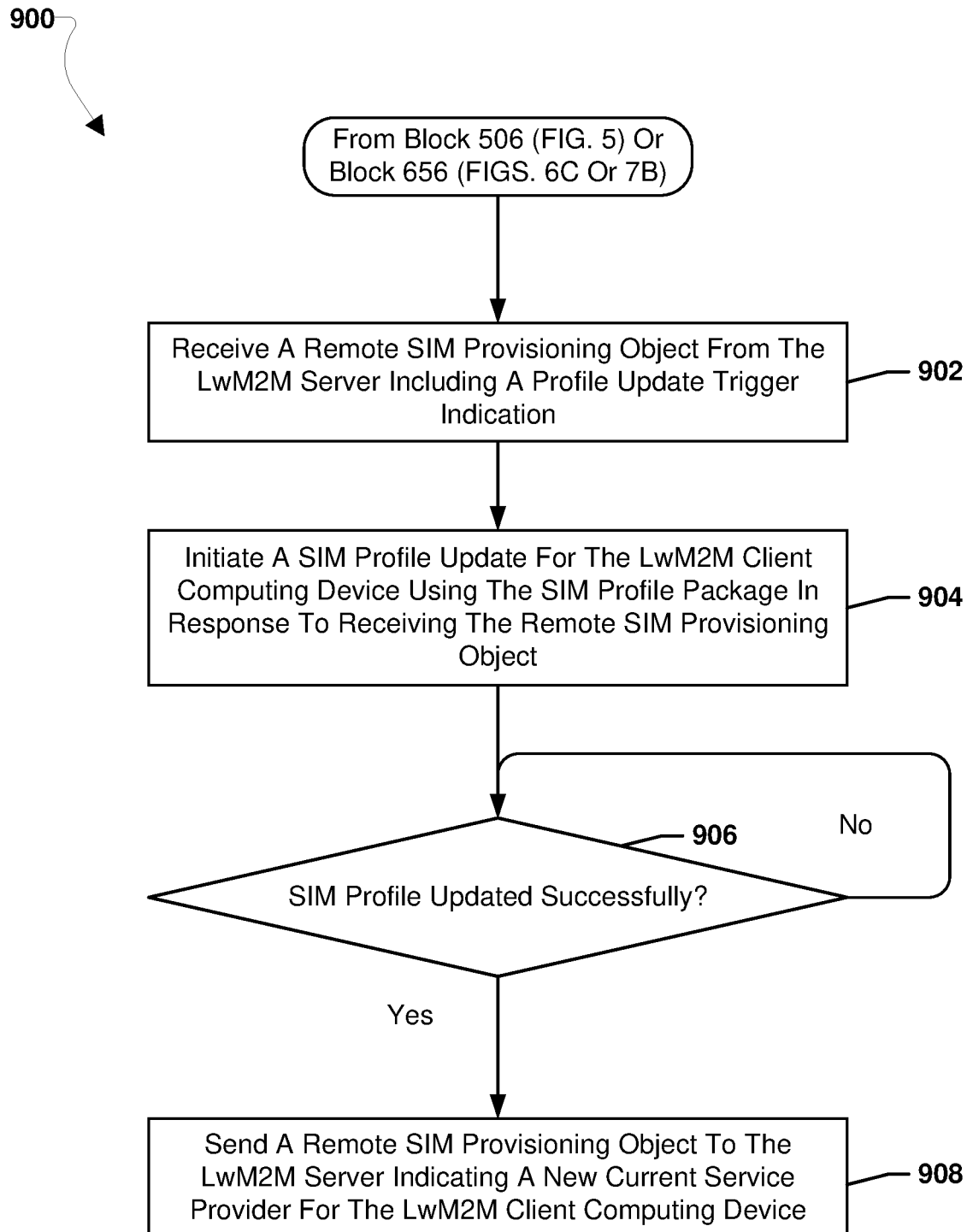
FIG. 9 is a process flow diagram illustrating a method that may be performed by an LwM2M client computing device for supporting remote SIM profile provisioning in accordance with some embodiments.

FIG. 9 is a process flow diagram illustrating a method 900 that may be performed by an LwM2M client computing device for supporting remote SIM profile provisioning in accordance with some embodiments. With reference to FIGS. 1-9, the method 900 may be implemented in hardware components and/or software components of a LwM2M client computing device (e.g., 120a-e, 200, 302, etc.), the operations of which may be controlled by one or more processors (e.g., 212, 216, 252 or 260). For ease of reference, the hardware performing the method 900 is referred to generally herein as a "processor." Operations of the method 900 may be performed by an LwM2M client computing device in conjunction with the operations of method 500 (FIG. 5), method 650 (FIG. 6C), and/or method 750 (FIG. 7B). For example, the operations of method 900 may be performed in response to the operations to download the SIM profile update in block 506 of method 500 (FIG. 5) and/or in response to the operations to send a remote SIM provisioning object indicating the SIM profile package is in a downloaded state in block 656 of method 650 (FIG. 6C) or method 750 (FIG. 7B).

In block 902, the processor may receive a remote SIM provisioning object from the LwM2M server including a profile update trigger indication. For example, the remote SIM provisioning object (e.g., 351) may include a profile update IE (e.g., 359) including an executable code or code fragment that may be executed by the LwM2M client computing device to update a SIM profile using a previously successfully downloaded SIM profile package.

In block 904, the processor may initiate a SIM profile update for the LwM2M client computing device using the SIM profile package in response to receiving the remote SIM provisioning object. For example, the processor may execute the executable code or code fragment to attempt to update the SIM profile.

In determination block 906, the processor may determine whether the SIM profile update successfully.

In response to determining the update is not successfully completed (i.e., determination block 906="No"), the processor may await successfully completion and determine whether the SIM profile update successfully in determination block 906.

In response to determining the update is successfully completed (i.e., determination block 906="Yes"), the processor may send a remote SIM provisioning object to the LwM2M server indicating a new current service provider for the LwM2M client computing device in block 908. For example, the remote SIM provisioning object may be an object 312, 351 indicating a changed service provider for the LwM2M client computing device.

Figure 10A:
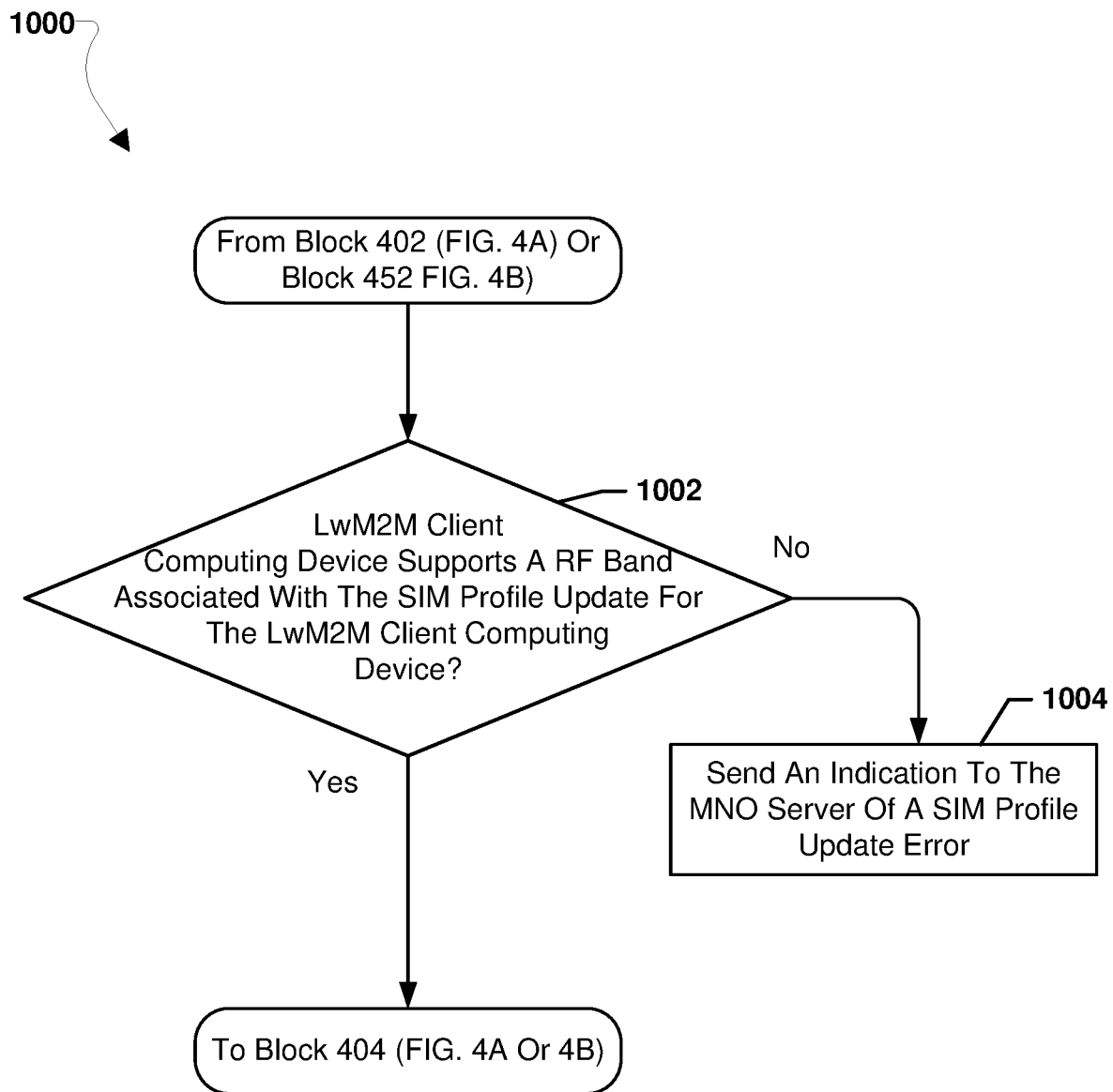
FIG. 10A is a process flow diagram illustrating a method that may be performed by an LwM2M server for supporting remote SIM profile provisioning in accordance with some embodiments.

FIG. 10A is a process flow diagram illustrating a method 1000 that may be performed by an LwM2M server for supporting remote SIM profile provisioning in accordance with some embodiments. With reference to FIGS. 1-10A, the method 1000 may be implemented in hardware components and/or software components of a network element functioning as an LwM2M server (e.g., 190, 304a), the operations of which may be controlled by one or more processors. For ease of reference, the hardware performing the method 1000 is referred to generally herein as a "processor." Operations of the method 1000 may be performed by an LwM2M server in conjunction with the operations of method 400 (FIG. 4A) and/or 450 (FIG. 4B). For example, the operations of method 1000 may be performed in response to receiving an indication of a SIM profile update for the LwM2M client computing device from an MNO server in block 402 and prior to generating a remote SIM provisioning object in block 404 of method 400 (FIG. 4A). As another example, the operations of the method 1000 may be performed in response to receiving an indication of a SIM profile update for the LwM2M client computing device from an SM-DP+ server in block 452 and prior to generating a remote SIM provisioning object in block 404 of the method 450 (FIG. 4B).

In determination block 1002, the processor may determine whether the LwM2M client computing device supports a RF band associated with the SIM profile update for the LwM2M client computing device. For example, the processor may compare the RF band associated with the SIM profile update to a list of supported LTE bands, a list of supported EGPRS bands, a list of supported TD-SCDMA bands, a list of supported WCDMA bands, a list of supported WiMax bands, a list of supported NB-IoT bands, and/or a list of supported 5G bands of the LwM2M client computing device to determine whether the RF band associated with the SIM profile update is any of the lists. The RF band associated with the SIM profile update being present in a supported list may indicate the LwM2M client computing device supports the RF band associated with the SIM profile update for the LwM2M client computing device.

In response to determining that the LwM2M client computing device does not support a RF band associated with the SIM profile update for the LwM2M client computing device (i.e., determination block 1002="No"), the processor may send an indication to the MNO server of a SIM profile update error in block 1004.

In response to determining that the LwM2M client computing device does support a RF band associated with the SIM profile update for the LwM2M client computing device (i.e., determination block 1002="Yes"), the processor may generate a remote SIM provisioning object in block 404 of the method 400 (FIG. 4A) or the method 450 (FIG. 4B).

Figure 10B:
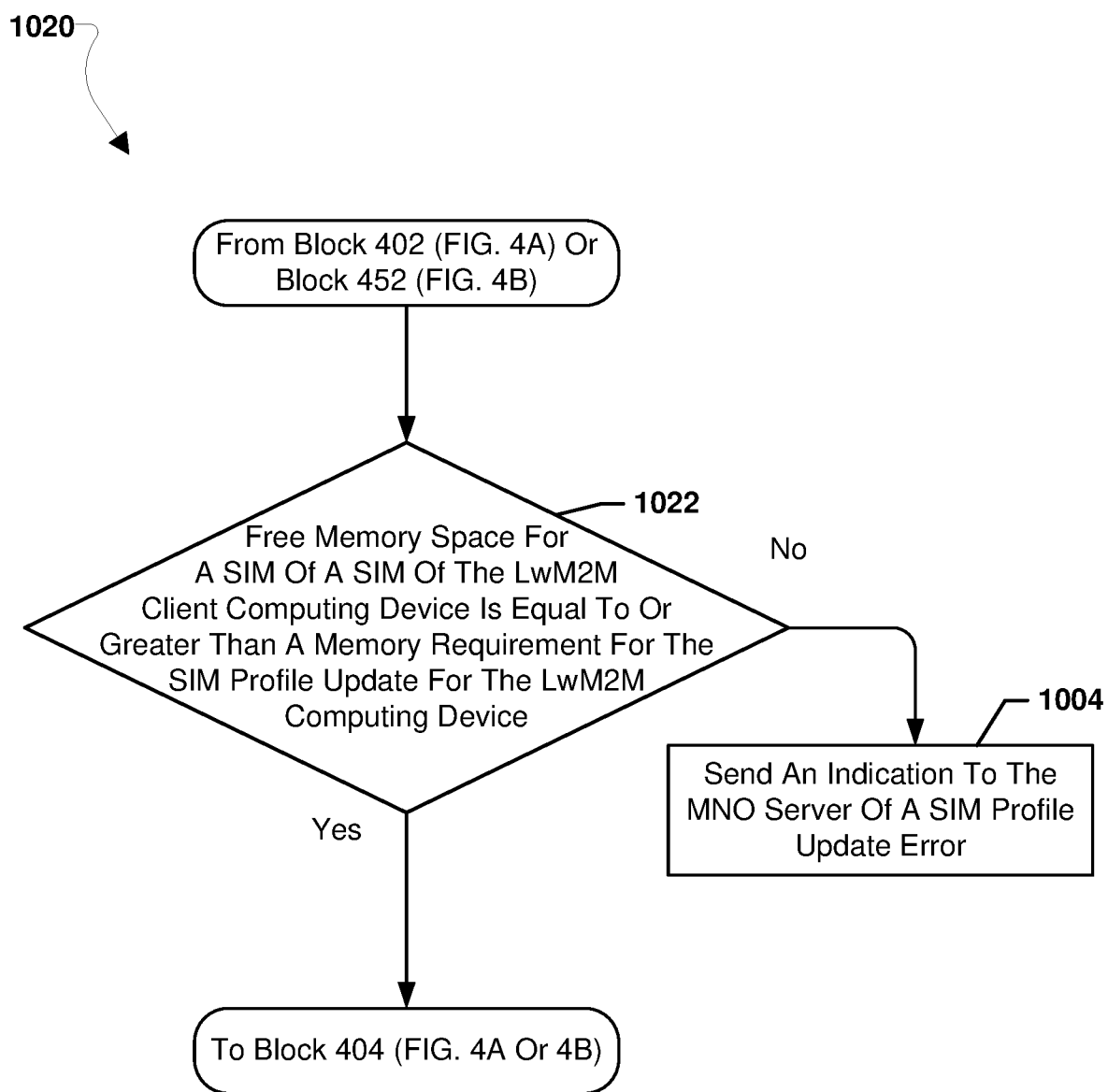
FIG. 10B is a process flow diagram illustrating a method that may be performed by an LwM2M server for supporting remote SIM profile provisioning in accordance with some embodiments.

FIG. 10B is a process flow diagram illustrating a method 1020 that may be performed by an LwM2M server for supporting remote SIM profile provisioning in accordance with some embodiments. With reference to FIGS. 1-10B, the method 1020 may be implemented in hardware components and/or software components of a network element functioning as an LwM2M server (e.g., 190, 304a), the operations of which may be controlled by one or more processors. For ease of reference, the hardware performing the method 1020 is referred to generally herein as a "processor." Operations of the method 1020 may be performed by an LwM2M server in conjunction with the operations of the method 400 (FIG. 4A) and/or the method 450 (FIG. 4B). For example, the operations of method 1020 may be performed in response to receiving an indication of a SIM profile update for the LwM2M client computing device from an MNO server in block 402 and prior to generating a remote SIM provisioning object in block 404 of the method 400 (FIG. 4A). As another example, the operations of method 1020 may be performed in response to receiving an indication of a SIM profile update for the LwM2M client computing device from an SM-DP+ server in block 452 and prior to generating a remote SIM provisioning object in block 404 of method 450 (FIG. 4B).

In determination block 1022, the processor may determine whether a free memory space for a SIM of the LwM2M client computing device is equal to or greater than a memory requirement for the SIM profile update for the LwM2M client computing device. For example, the processor may compare the SIM profile update's size to the free memory space for the SIM of the LwM2M client computing device to determine whether the free memory space for a SIM of the LwM2M client computing device is equal to or greater than a memory requirement for the SIM profile update for the LwM2M client computing device. The comparison may be made in any manner, such as by subtracting the free memory space value from the size value of the SIM profile such that a zero or negative result indicates the free memory space for a SIM of the LwM2M client computing device is equal to or greater than a memory requirement for the SIM profile update for the LwM2M client computing device.

In response to determining that the free memory space for a SIM of the LwM2M client computing device is less than a memory requirement for the SIM profile update for the LwM2M client computing device (i.e., determination block 1022="No"), the processor may send an indication to the MNO server of a SIM profile update error in block 1004.

In response to determining that the free memory space for a SIM of the LwM2M client computing device is equal to or greater than a memory requirement for the SIM profile update for the LwM2M client computing device (i.e., determination block 1022="Yes"), the processor may generate a remote SIM provisioning object in block 404 of the method 400 (FIG. 4A) or the method 450 (FIG. 4B).

Figure 11:
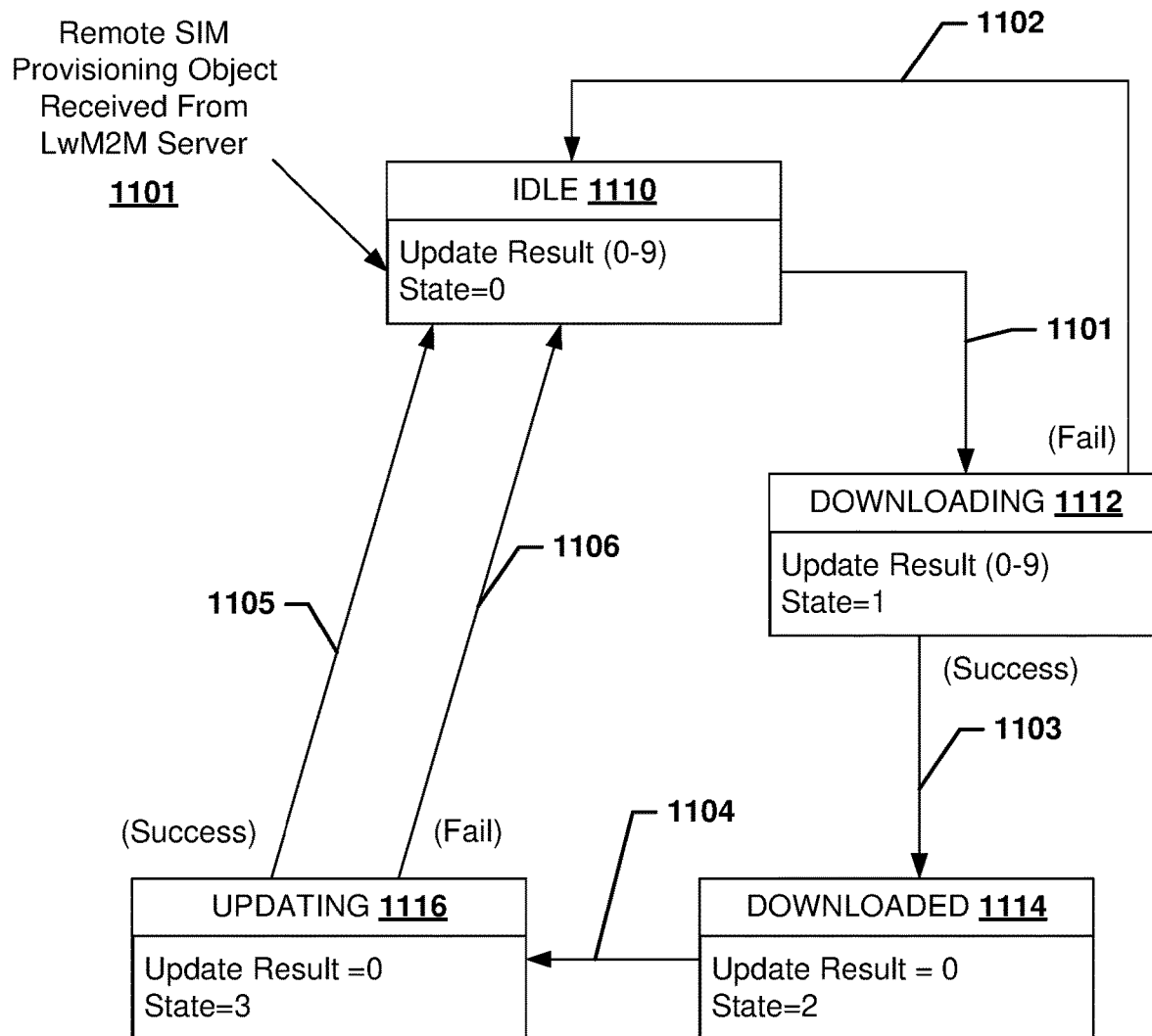
FIG. 11 is a state diagram showing example operations that may be performed by an LwM2M client computing device for supporting remote SIM profile provisioning in accordance with some embodiments.

FIG. 11 is a state diagram showing example operations that may be performed by an LwM2M client computing device (e.g., 120a-e, 200, 302) for supporting remote SIM profile provisioning in accordance with various embodiments. With reference to FIGS. 1-11, the states and operations illustrated in FIG. 11 may be an example implementation of operations of one or more of methods 400 (FIG. 4A), 450 (FIG. 4B), 500 (FIG. 5), 600 (FIG. 6A), 610 (FIG. 6B), 650 (FIG. 6C), 700 (FIG. 7A), 750 (FIG. 7B), 800 (FIG. 8), 900 (FIG. 9), 1000 (FIG. 10A), and/or 1020 (FIG. 10B).

Initially, the LwM2M client computing device may be in an idle state 1110 in regard to a SIM profile update. The initial value of the update result for the LwM2M client computing device may be zero and the value of the idle state may be zero. The LwM2M client computing device may receive a remote SIM provisioning object (e.g., 312, 351) from the LwM2M server (e.g., 190, 304a) in operation 1101. The remote SIM provisioning object may indicate that a SIM profile update for the LwM2M client computing device is available.

In response to receiving the remote SIM provisioning object (e.g., 312, 351) from the LwM2M server (e.g., 190, 304a) in operation 1101 the LwM2M client computing may transition to a downloading state 1112 and attempt to download and write the SIM profile package. The downloading may be via the SIM profile package being pulled using a profile URI and/or via the SIM profile package being pushed in one or more remote SIM provisioning objects. The value of the downloading state may be one. The value of the update result may be change based on the result of the download. An initial value may be zero. The downloading failing may result in the update result being set to a value of two to nine indicating a failure reason and in operation 1102 the state may return to the idle state 1110 to enable downloading to be reattempted. The downloading succeeding may result in the update result being set to a value of one indicating success and in operation 1103 the state may transition to a downloaded state 1114 which may be set to a value of two associated with the downloaded state 1114. Upon entering the downloaded state 1114, the update result value may be returned to a zero value.

In operation 1104, the LwM2M client computing device may receive a remote SIM provisioning object (e.g., 312, 351) from the LwM2M server (e.g., 190, 304a) including an update trigger. The receipt of the update trigger may result in the state transitioning to an updating state 1116 which may be set to a value of three associated with the updating state 1116. Upon entering the downloaded state 1114, the update result value may be returned to a zero value. The updating failing may result in the update result being set to a value of two to nine indicating a failure reason and in operation 1106 the state may return to the idle state 1110 to enable downloading to be reattempted. The update succeeding may result in the update result being set to a value of one indicating a success and in operation 1105 the state may return to the idle state 1110. Upon entering the idle state 1110 with an update successfully completed, the update result may be shifted to a value of zero.

Figure 12:
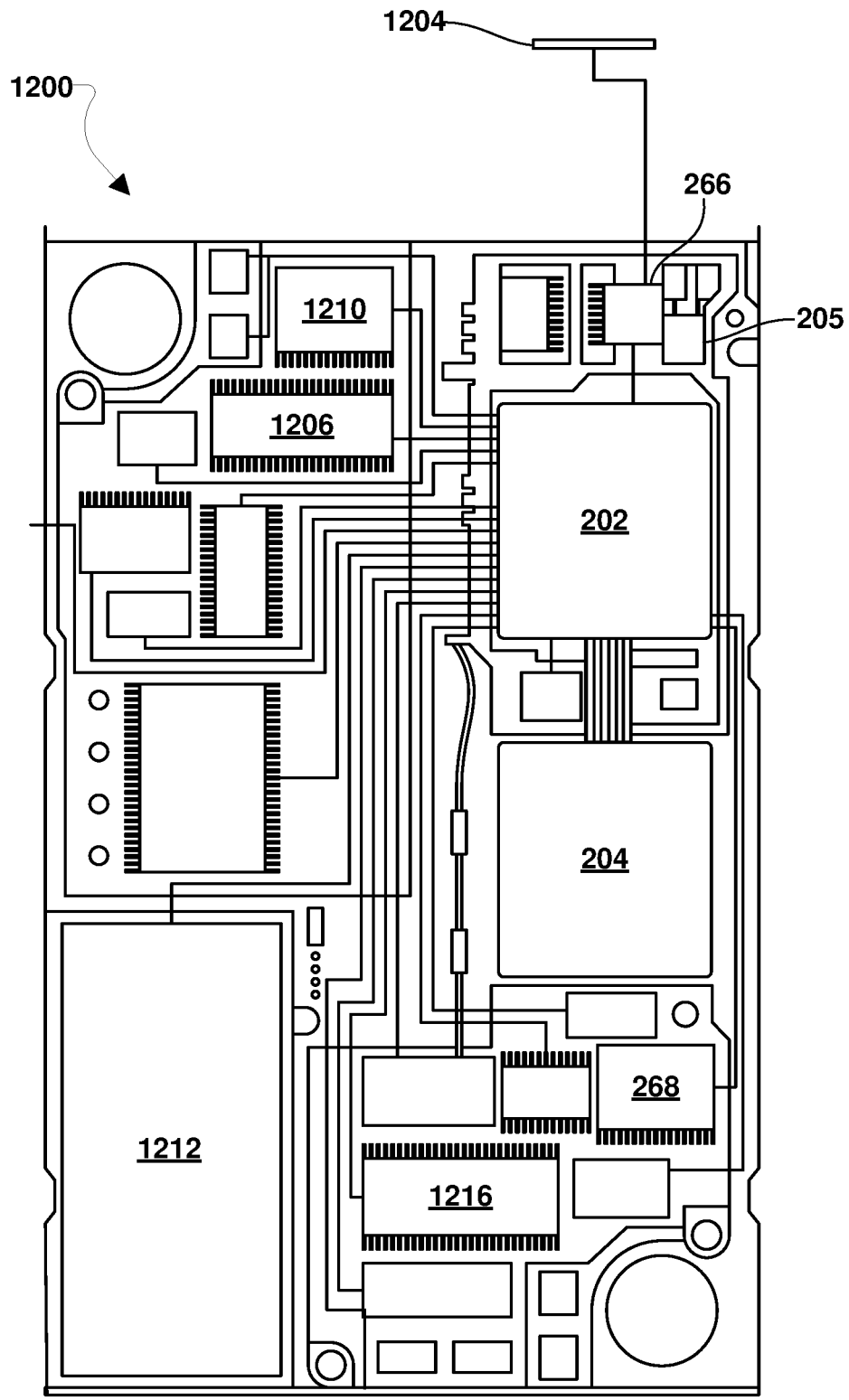
FIG. 12 is a component block diagram of an IoT device suitable for use with various embodiments.

Various embodiments (including, but not limited to, embodiments discussed above with reference to FIGS. 1-11) may be implemented on a variety of IoT devices, particularly an LwM2M client computing device, an example in the form of a circuit board for use in a device is illustrated in FIG. 12. With reference to FIGS. 1-12, an IoT device 1200 (e.g., 120a-e, 200, 302) may include a first SOC 202 (e.g., a SOC-CPU) coupled to a second SOC 204 (e.g., a 5G capable SOC) and a temperature sensor 205. The first and second SOCs 202, 204 may be coupled to internal memory 1206. Additionally, the IoT device 1200 may include or be coupled to an antenna 1204 for sending and receiving wireless signals from a wireless transceiver 266 or within the second SOC 204. The IoT device 1200 may include a SIM 268. The antenna 1204 and wireless transceiver 266, SIM 268, and/or second SOC 204 may support communications using various RATs, including NB-IoT, CIoT, GSM, and/or VoLTE, 5G, WiMAX, CDMA-2000, LTE, EGPRS, etc.

An IoT device 1200 may also include a sound encoding/decoding (CODEC) circuit 1210, which digitizes sound received from a microphone into data packets suitable for wireless transmission and decodes received sound data packets to generate analog signals that are provided to a speaker to generate sound in support of voice or VoLTE calls. Also, one or more of the processors in the first and second SOCs 202, 204, wireless transceiver 266 and CODEC 1210 may include a digital signal processor (DSP) circuit (not shown separately).

Some IoT devices may include an internal power source, such as a battery 1212 configured to power the SOCs and transceiver(s). Such IoT devices may include power management components 1216 to manage charging of the battery 1212.

Figure 13:
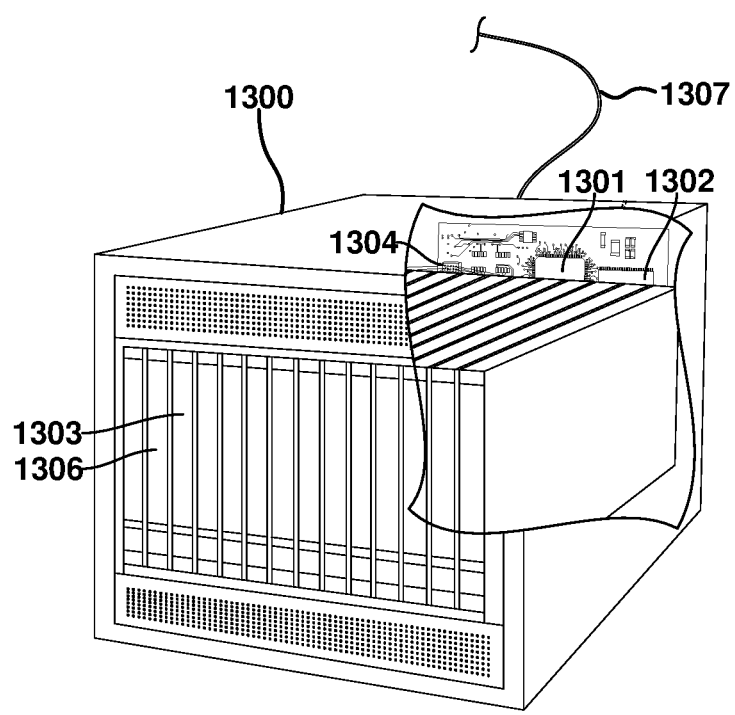
FIG. 13 is a component diagram of an example server suitable for use implementing various embodiments.

The various embodiments (including, but not limited to, embodiments discussed above with reference to FIGS. 1-11) may also be implemented on any of a variety of commercially available server devices, such as the server 1300 (e.g., server 190, 191, 193, 304) illustrated in FIG. 13. With reference to FIGS. 1-13, such a server 1300 typically includes a processor 1301 coupled to volatile memory 1302 and a large capacity nonvolatile memory, such as a disk drive 1303. The server 1300 may also include a floppy disc drive, compact disc (CD) or digital versatile disc (DVD) drive 1306 coupled to the processor 1301. The server 1300 may also include one or more network transceivers 1304, such as a network access port, coupled to the processor 1301 for establishing network interface connections with a communication network 1307, such as a local area network coupled to other announcement system computers and servers, the Internet, the public switched telephone network, and/or a cellular network (e.g., CDMA, TDMA, GSM, PCS, 3G, 4G, 5G, LTE, or any other type of cellular network).

Figure 14:
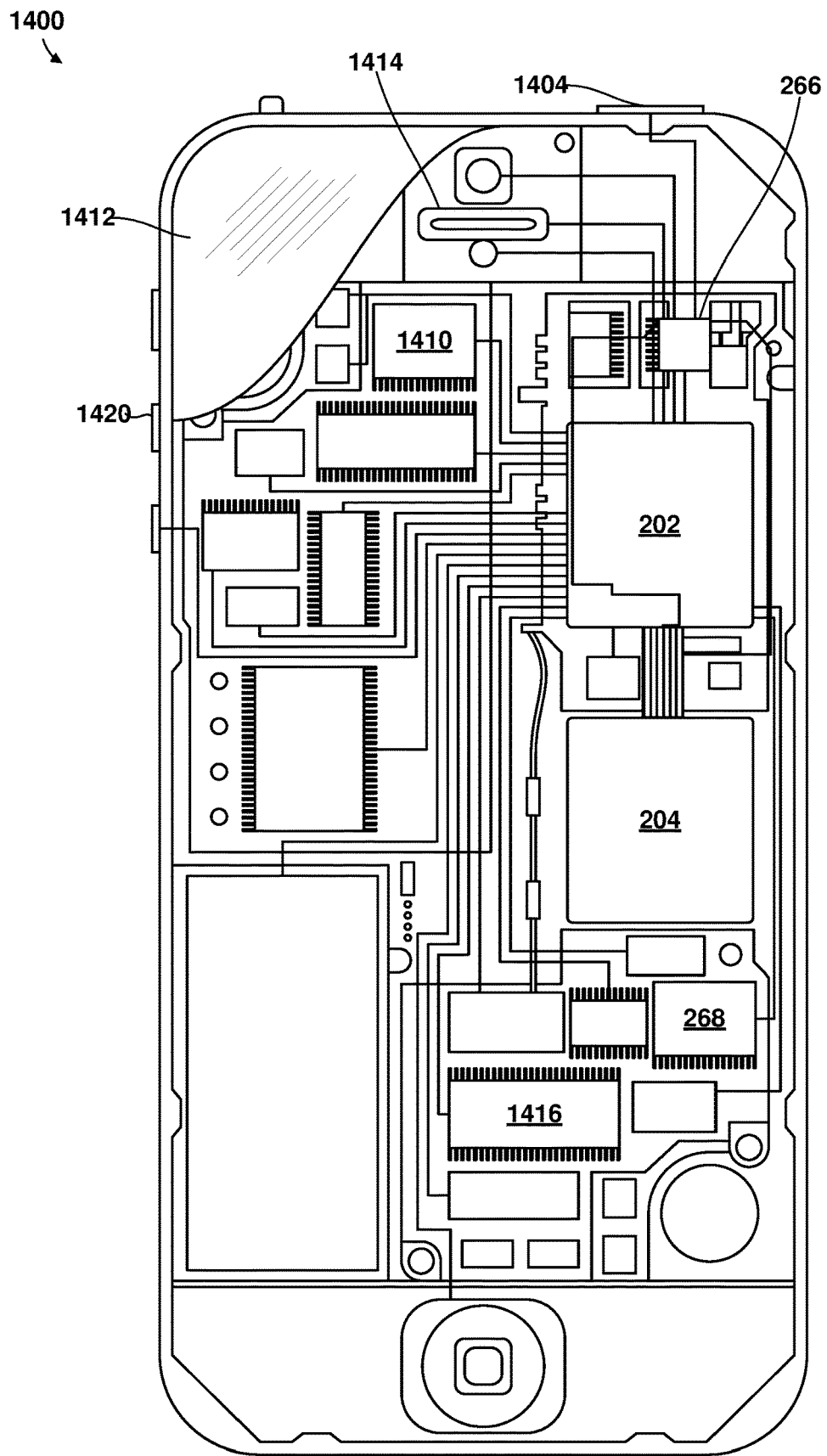
FIG. 14 is a component block diagram of a wireless device suitable for implementing various embodiments.

FIG. 14 is a component block diagram of a wireless device 1400 suitable for use with various embodiments. With reference to FIGS. 1-14, various embodiments may be implemented on a variety of wireless device 1400 (e.g., the wireless device 120a-120e, 200, 302), an example of which is illustrated in FIG. 14 in the form of a smartphone. The wireless device 1400 may include a first SOC 202 (e.g., a SOC-CPU) coupled to a second SOC 204 (e.g., a 5G capable SOC). The first and second SOCs 202, 204 may be coupled to internal memory, 1416, a display 1412, and to a speaker 1414. Additionally, the wireless device 1400 may include an antenna 1404 for sending and receiving electromagnetic radiation that may be connected to a wireless transceiver 266 coupled to one or more processors in the first and/or second SOCs 202, 204. The wireless device 1400 may include a SIM 268. The antenna 1404 and wireless transceiver 266, SIM 268, and/or second SOC 204 may support communications using various RATs, including NB-IoT, CIoT, GSM, and/or VoLTE, 5G, WiMAX, CDMA-2000, LTE, EGPRS, etc. The wireless device 1400 may also include menu selection buttons or rocker switches 1420 for receiving user inputs.

The wireless device 1400 also includes a sound encoding/decoding (CODEC) circuit 1410, which digitizes sound received from a microphone into data packets suitable for wireless transmission and decodes received sound data packets to generate analog signals that are provided to the speaker to generate sound. Also, one or more of the processors in the first and second SOCs 202, 204, wireless transceiver 266 and CODEC 1410 may include a digital signal processor (DSP) circuit (not shown separately).

The processors of the IoT device 1200, server 1300, and wireless device 1400 may be any programmable microprocessor, microcomputer or multiple processor chip or chips that can be configured by software instructions (applications) to perform a variety of functions, including the functions of various embodiments described below. In some mobile devices, multiple processors may be provided, such as one processor within an SOC 204 dedicated to wireless communication functions and one processor within an SOC 202 dedicated to running other applications. Software applications may be stored in the memory before they are accessed and loaded into the processor. The processors may include internal memory sufficient to store the application software instructions.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on an IoT device and the IoT device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

A number of different cellular and mobile communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), 3GSM, general packet radio service (GPRS), code division multiple access (CDMA) systems (e.g., cdmaOne, CDMA1020™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iden). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods 400, 450, 500, 600, 610, 650, 700, 750, 800, 900, 1000, and/or 1020 may be substituted for or combined with one or more operations of the methods 400, 450, 500, 600, 610, 650, 700, 750, 800, 900, 1000, and/or 1020.

Implementation examples are described in the following paragraphs. While some of the following implementation examples are described in terms of example methods, further example implementations may include: the example methods discussed in the following paragraphs implemented by a LwM2M client computing device comprising a processor configured with processor-executable instructions to perform operations of the methods of the following implementation examples and/or a LwM2M server comprising a processor configured with processor-executable instructions to perform operations of the methods of the following implementation examples; the example methods discussed in the following paragraphs implemented by a LwM2M client computing device comprising means for performing functions of the methods of the following implementation examples and/or a LwM2M server comprising means for performing functions of the methods of the following implementation examples; and the example methods discussed in the following paragraphs may be implemented as a non-transitory processor-readable storage medium having stored thereon processor-executable instructions configured to cause a processor of a LwM2M client computing device to perform the operations of the methods of the following implementation examples and/or a non-transitory processor-readable storage medium having stored thereon processor-executable instructions configured to cause a processor of a LwM2M server to perform the operations of the methods of the following implementation examples.

> Example 1. A method for supporting remote Subscriber Identity Module (SIM) profile provisioning, including: receiving, by a processor of a Lightweight Machine-to-Machine (LwM2M) server, an indication of a SIM profile update for a LwM2M client computing device from a mobile network operator server; generating, by the processor of the LwM2M server, a remote SIM provisioning object for the LwM2M client computing device indicating that the SIM profile update for the LwM2M client computing device is available; and sending, by the processor of the LwM2M server, the remote SIM provisioning object to the LwM2M client computing device.
>
> Example 2. The method of example 1, further including: receiving, by the processor of the LwM2M server, a SIM profile package from the mobile network operator server; and sending, by the processor of the LwM2M server, the SIM profile package to the LwM2M client computing device in one or more additional remote SIM provisioning objects.

Example 3. The method of example 1, wherein: the indication of the SIM profile update for the LwM2M client computing device from the mobile network operator server includes one or more addresses at which a SIM profile package from the mobile network operator server is available for download by the LwM2M client computing device; and the remote SIM provisioning object includes one of the one or more addresses.

Example 4. The method of example 3, further including: determining, by the processor of the LwM2M server, a SIM profile update protocol supported by the LwM2M client computing device; and selecting, by the processor of the LwM2M server, the one of the one or more addresses based at least in part on the SIM profile update protocol supported by the LwM2M client computing device.

Example 5. The method of any of examples 1-4, further including, prior to generating the remote SIM provisioning object: determining, by the processor of the LwM2M server, whether the LwM2M client computing device supports a radio frequency (RF) band associated with the SIM profile update for the LwM2M client computing device; and sending, by the processor of the LwM2M server, an indication to the mobile network operator server of a SIM profile update error in response to determining that the LwM2M client computing device does not support a RF band associated with the SIM profile update for the LwM2M client computing device, wherein generating the remote SIM provisioning object includes generating, by the processor of the LwM2M server, the remote SIM provisioning object in response to determining that the LwM2M client computing device does support a RF band associated with the SIM profile update for the LwM2M client computing device.

Example 6. The method of any of examples 1-5, further including, prior to generating the remote SIM provisioning object: determining, by the processor of the LwM2M server, whether free memory space for a SIM of the LwM2M client computing device is equal to or greater than a memory requirement for the SIM profile update for the LwM2M client computing device; and sending, by the processor of the LwM2M server, an indication to the mobile network operator server of a SIM profiled update error in response to determining that the free memory space for the SIM is less than the memory requirement for the SIM profile update for the LwM2M client computing device, wherein generating the remote SIM provisioning object includes generating, by the processor of the LwM2M server, the remote SIM provisioning object in response to determining that the free memory space for the SIM is equal to or greater than the memory requirement for the SIM profile update for the LwM2M client computing device.

Example 7. The method of any of examples 1-6, wherein sending the remote SIM provisioning object to the LwM2M client computing device includes sending, by the processor of the LwM2M server, the remote SIM provisioning object to the LwM2M client computing device using a secure connection.

Example 8. The method of any of examples 1-7, further including: determining, by the processor of the LwM2M server, whether a second remote SIM provisioning object from the LwM2M client computing device indicating that a SIM profile package was successfully downloaded by the LwM2M client computing device was received; generating, by the processor of the LwM2M server, a third remote SIM provisioning object for the LwM2M client computing device including a profile update trigger indication in response to determining that the second remote SIM provisioning object from the LwM2M client computing device was received; and sending, by the processor of the LwM2M server, the third remote SIM provisioning object to the LwM2M client computing device.

Example 9. A method for supporting remote Subscriber Identity Module (SIM) profile provisioning, including: receiving, by a processor of a Lightweight Machine-to-Machine (LwM2M) client computing device, a remote SIM provisioning object from a LwM2M server indicating that a SIM profile update for the LwM2M client computing device is available; and downloading, by the processor of the LwM2M client computing device, the SIM profile update in response to receiving the remote SIM provisioning object.

Example 10. The method of example 9, wherein downloading the SIM profile update includes: receiving, by the processor of the LwM2M client computing device, a SIM profile package in one or more additional remote SIM provisioning objects from the LwM2M server; determining, by the processor of the LwM2M client computing device, whether the SIM profile package passes an integrity check; sending, by the processor of the LwM2M client computing device, a remote SIM provisioning object indicating the integrity check failed to the LwM2M server in response to determining that the SIM profile package did not pass the integrity check; and sending, by the processor of the LwM2M client computing device, a remote SIM provisioning object indicating the SIM profile package is in a downloaded state to the LwM2M server in response to determining that the SIM profile package passed the integrity check.

Example 11. The method of example 9, wherein: the remote SIM provisioning object includes an address at which a SIM profile package is available for download; and downloading the SIM profile update includes s: sending, by the processor of the LwM2M client computing device, a request for the SIM profile package to the address; receiving, by the processor of the LwM2M client computing device, the SIM profile package in response to sending the request for the SIM profile package to the address; determining, by the processor of the LwM2M client computing device, whether the SIM profile package passes an integrity check; sending, by the processor of the LwM2M client computing device, a remote SIM provisioning object indicating the integrity check failed to the LwM2M server in response to determining that the SIM profile package did not pass the integrity check; and sending, by the processor of the LwM2M client computing device, a remote SIM provisioning object indicating the SIM profile package is in a downloaded state to the LwM2M server in response to determining that the SIM profile package passed the integrity check.

Example 12. The method of example 11, wherein the address is a uniform resource indicator (URI) associated with a server other than the LwM2M server.

Example 13. The method of any of examples 9-12, wherein receiving the remote SIM provisioning object includes s receiving, by the processor of the LwM2M client computing device, the remote SIM provisioning object from the LwM2M server using a secure connection.

Example 14. The method of any of examples 9-13, further comprising: receiving, by the processor of the LwM2M client computing device, a SIM profile package; receiving, by the processor of the LwM2M client computing device, a second remote SIM provisioning object from the LwM2M server including a profile update trigger indication; and initiating, by the processor of the LwM2M client computing device, a SIM profile update for the LwM2M client computing device using the SIM profile package in response to receiving the second remote SIM provisioning object.

Example 15. The method of example 14, further including, in response to successfully updating the SIM profile: sending, by the processor of the LwM2M client computing device, a third remote SIM provisioning object to the LwM2M server indicating a new current service provider for the LwM2M client computing device.

Example 16. The method of any of examples 1-15, wherein the LwM2M client computing device is an Internet of Things (IoT) device.

Example 17. A method for supporting remote Subscriber Identity Module (SIM) profile provisioning, including: generating, by a processor of a Lightweight Machine-to-Machine (LwM2M) server, a remote SIM provisioning object for a LwM2M client computing device indicating that a SIM profile update for the LwM2M client computing device is available; and sending, by the processor of the LwM2M server, the remote SIM provisioning object to the LwM2M client computing device.

Example 18. The method of example 17, further including: receiving, by the processor of the LwM2M server, a SIM profile package from a Subscription Manager Data Preparation (SM-DP+) server; and sending, by the processor of the LwM2M server, the SIM profile package to the LwM2M client computing device in one or more additional remote SIM provisioning objects.

Example 19. The method of any of examples 17-18, further including, prior to generating the remote SIM provisioning object: determining, by the processor of the LwM2M server, whether the LwM2M client computing device supports a radio frequency (RF) band associated with the SIM profile update for the LwM2M client computing device; and sending, by the processor of the LwM2M server, an indication to a mobile network operator server of a SIM profile update error in response to determining that the LwM2M client computing device does not support a RF band associated with the SIM profile update for the LwM2M client computing device, wherein generating the remote SIM provisioning object includes s generating, by the processor of the LwM2M server, the remote SIM provisioning object in response to determining that the LwM2M client computing device does support a RF band associated with the SIM profile update for the LwM2M client computing device.

Example 20. The method of any of examples 17-19, further including, prior to generating the remote SIM provisioning object: determining, by the processor of the LwM2M server, whether free memory space for a SIM of the LwM2M client computing device is equal to or greater than a memory requirement for the SIM profile update for the LwM2M client computing device; and sending, by the processor of the LwM2M server, an indication to a mobile network operator server of a SIM profiled update error in response to determining that the free memory space for the SIM is less than the memory requirement for the SIM profile update for the LwM2M client computing device, wherein generating the remote SIM provisioning object includes generating, by the processor of the LwM2M server, the remote SIM provisioning object in response to determining that the free memory space for the SIM is equal to or greater than the memory requirement for the SIM profile update for the LwM2M client computing device.

Example 21. The method of any of examples 17-20, wherein sending the remote SIM provisioning object to the LwM2M client computing device includes sending, by the processor of the LwM2M server, the remote SIM provisioning object to the LwM2M client computing device using a secure connection.

Example 22. The method of any of examples 17-21, further including: determining, by the processor of the LwM2M server, whether a second remote SIM provisioning object from the LwM2M client computing device indicating that a SIM profile package was successfully downloaded by the LwM2M client computing device was received; generating, by the processor of the LwM2M server, a third remote SIM provisioning object for the LwM2M client computing device including a profile update trigger indication in response to determining that the second remote SIM provisioning object from the LwM2M client computing device was received; and sending, by the processor of the LwM2M server, the third remote SIM provisioning object to the LwM2M client computing device.

Example 23. A method for supporting remote Subscriber Identity Module (SIM) profile provisioning, including: receiving, by a processor of a Lightweight Machine-to-Machine (LwM2M) client computing device, a remote SIM provisioning object from a LwM2M server indicating that a SIM profile update for the LwM2M client computing device is available; and downloading, by the processor of the LwM2M client computing device, the SIM profile update in response to receiving the remote SIM provisioning object.

Example 24. The method of example 23, wherein downloading the SIM profile update includes: receiving, by the processor of the LwM2M client computing device, a SIM profile package from a Subscription Manager Data Preparation (SM-DP+) server in one or more additional remote SIM provisioning objects from the LwM2M server.

Example 25. The method of any of examples 17-24, wherein the LwM2M client computing device is an Internet of Things (IoT) device.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method for supporting remote Subscriber Identity Module (SIM) profile provisioning, comprising:
    generating, by a processor of a Lightweight Machine-to-Machine (LwM2M) server, a remote SIM provisioning object for a LwM2M client computing device indicating that a SIM profile update for the LwM2M client computing device is available;
    sending, by the processor of the LwM2M server, the remote SIM provisioning object to the LwM2M client computing device;
    receiving, by the processor of the LwM2M server, a second remote SIM provisioning object associated with a result of an integrity check of a SIM profile package from the LwM2M client computing device, wherein the SIM profile package is associated with the SIM profile update;
    receiving, by the processor of the LwM2M server, the SIM profile package from a Subscription Manager Data Preparation (SM-DP+) server; and
    sending, by the processor of the LwM2M server, the SIM profile package to the LwM2M client computing device in one or more additional remote SIM provisioning objects;
    wherein prior to generating the remote SIM provisioning object, the method further comprising:
        determining, by the processor of the LwM2M server, whether the LwM2M client computing device supports a radio frequency (RF) band associated with the SIM profile update for the LwM2M client computing device; and
        sending, by the processor of the LwM2M server, an indication to a mobile network operator server of a SIM profile update error in response to determining that the LwM2M client computing device does not support a RF band associated with the SIM profile update for the LwM2M client computing device,
    wherein generating the remote SIM provisioning object comprises generating, by the processor of the LwM2M server, the remote SIM provisioning object in response to determining that the LwM2M client computing device does support a RF band associated with the SIM profile update for the LwM2M client computing device.

2. The method of claim 1, further comprising, prior to generating the remote SIM provisioning object:
    determining, by the processor of the LwM2M server, whether free memory space for a SIM of the LwM2M client computing device is equal to or greater than a memory requirement for the SIM profile update for the LwM2M client computing device; and
    sending, by the processor of the LwM2M server, an indication to a mobile network operator server of a SIM profiled update error in response to determining that the free memory space for the SIM is less than the memory requirement for the SIM profile update for the LwM2M client computing device, wherein generating the remote SIM provisioning object comprises generating, by the processor of the LwM2M server, the remote SIM provisioning object in response to determining that the free memory space for the SIM is equal to or greater than the memory requirement for the SIM profile update for the LwM2M client computing device.

3. The method of claim 1, wherein sending the remote SIM provisioning object to the LwM2M client computing device comprises sending, by the processor of the LwM2M server, the remote SIM provisioning object to the LwM2M client computing device using a secure connection.

4. The method of claim 1, further comprising:
determining, by the processor of the LwM2M server, whether the second remote SIM provisioning object from the LwM2M client computing device indicating that a SIM profile package was successfully downloaded by the LwM2M client computing device was received;
generating, by the processor of the LwM2M server, a third remote SIM provisioning object for the LwM2M client computing device including a profile update trigger indication in response to determining that the second remote SIM provisioning object from the LwM2M client computing device was received; and
sending, by the processor of the LwM2M server, the third remote SIM provisioning object to the LwM2M client computing device.

5. A Lightweight Machine-to-Machine (LwM2M) server, comprising:
a processor configured with processor-executable instructions to:
generate a remote Subscriber Identity Module (SIM) provisioning object for a LwM2M client computing device indicating that a SIM profile update for the LwM2M client computing device is available;
send the remote SIM provisioning object to the LwM2M client computing device;
receive a second remote SIM provisioning object associated with a result of an integrity check of a SIM profile package from the LwM2M client computing device, wherein the SIM profile package is associated with the SIM profile update;
receive the SIM profile package from a Subscription Manager Data Preparation SM-DP+) server; and
send the SIM profile package to the LwM2M client computing device in one or more additional remote SIM provisioning objects;
wherein the processor is further configured with processor-executable instructions to, prior to generating the remote SIM provisioning object:
determine whether the LwM2M client computing device supports a radio frequency (RF) band associated with the SIM profile update for the LwM2M client computing device; and
send an indication to a mobile network operator server of a SIM profile update error in response to determining that the LwM2M client computing device does not support a RF band associated with the SIM profile update for the LwM2M client computing device; and
the processor is configured with processor-executable instructions to generate the remote SIM provisioning object by generating the remote SIM provisioning object in response to determining that the LwM2M client computing device does support a RF band associated with the SIM profile update for the LwM2M client computing device.

6. The LwM2M server of claim 5, wherein:
the processor is further configured with processor-executable instructions to, prior to generating the remote SIM provisioning object:
determine whether free memory space for a SIM of the LwM2M client computing device is equal to or greater than a memory requirement for the SIM profile update for the LwM2M client computing device; and
send an indication to a mobile network operator server of a SIM profiled update error in response to determining that the free memory space for the SIM is less than the memory requirement for the SIM profile update for the LwM2M client computing device; and
the processor is configured with processor-executable instructions to generate the remote SIM provisioning object by generating the remote SIM provisioning object in response to determining that the free memory space for the SIM is equal to or greater than the memory requirement for the SIM profile update for the LwM2M client computing device.

7. The LwM2M server of claim 5, wherein the processor is further configured with processor-executable instructions to send the remote SIM provisioning object to the LwM2M client computing device by sending the remote SIM provisioning object to the LwM2M client computing device using a secure connection.

8. The LwM2M server of claim 5, wherein the processor is further configured with processor-executable instructions to:
determine whether the second remote SIM provisioning object from the LwM2M client computing device indicating that a SIM profile package was successfully downloaded by the LwM2M client computing device was received;
generate a third remote SIM provisioning object for the LwM2M client computing device including a profile update trigger indication in response to determining that the second remote SIM provisioning object from the LwM2M client computing device was received; and
send the third remote SIM provisioning object to the LwM2M client computing device.

9. A non-transitory processor-readable storage device having stored thereon processor-executable instructions to cause a processor of a Lightweight Machine-to-Machine (LwM2M) server to perform operations comprising:
generating a remote Subscriber Identity Module (SIM) provisioning object for a LwM2M client computing device indicating that a SIM profile update for the LwM2M client computing device is available;
sending the remote SIM provisioning object to the LwM2M client computing device;
receiving a second remote SIM provisioning object associated with a result of an integrity check of a SIM profile package from the LwM2M client computing device, wherein the SIM profile package is associated with the SIM profile update;
receiving, by the processor of the LwM2M server, the SIM profile package from a Subscription Manager Data Preparation (SM-DP+) server; and sending, by the processor of the LwM2M server, the SIM profile package to the LwM2M client computing device in one or more additional remote SIM provisioning objects;

wherein prior to generating the remote SIM provisioning object, the method further comprising:

determining, by the processor of the LwM2M server, whether the LwM2M client computing device supports a radio frequency (RF) band associated with the SIM profile update for the LwM2M client computing device; and sending, by the processor of the LwM2M server, an indication to a mobile network operator server of a SIM profile update error in response to determining that the LwM2M client computing device does not support a RF band associated with the SIM profile update for the LwM2M client computing device, wherein generating the remote SIM provisioning object comprises generating, by the processor of the LwM2M server, the remote SIM provisioning object in response to determining that the LwM2M client computing device does support a RF band associated with the SIM profile update for the LwM2M client computing device.

10. The non-transitory processor-readable storage device of claim 9, wherein the stored processor-executable instructions are configured to cause the processor to perform operations further comprising, prior to generating the remote SIM provisioning object:

determining whether free memory space for a SIM of the LwM2M client computing device is equal to or greater than a memory requirement for the SIM profile update for the LwM2M client computing device; and sending an indication to a mobile network operator server of a SIM profiled update error in response to determining that the free memory space for the SIM is less than the memory requirement for the SIM profile update for the LwM2M client computing device, wherein generating the remote SIM provisioning object comprises generating the remote SIM provisioning object in response to determining that the free memory space for the SIM is equal to or greater than the memory requirement for the SIM profile update for the LwM2M client computing device.

11. The non-transitory processor-readable storage device of claim 9, wherein the stored processor-executable instructions are configured to cause the processor to perform operations such that sending the remote SIM provisioning object to the LwM2M client computing device comprises sending the remote SIM provisioning object to the LwM2M client computing device using a secure connection.

12. The non-transitory processor-readable storage device of claim 9, wherein the stored processor-executable instructions are configured to cause the processor to perform operations further comprising:

determining whether the second remote SIM provisioning object from the LwM2M client computing device indicating that a SIM profile package was successfully downloaded by the LwM2M client computing device was received;

generating a third remote SIM provisioning object for the LwM2M client computing device including a profile update trigger indication in response to determining that the second remote SIM provisioning object from the LwM2M client computing device was received; and sending the third remote SIM provisioning object to the LwM2M client computing device.

\* \* \* \* \*